United States Patent
Ohtsu et al.

(10) Patent No.: US 8,346,269 B2
(45) Date of Patent: Jan. 1, 2013

(54) MOBILE NETWORK SYSTEM AND GUIDANCE MESSAGE PROVIDING METHOD

(75) Inventors: Kazuyuki Ohtsu, Kawasaki (JP); Yuji Tajima, Kawasaki (JP); Takashi Mitsuhashi, Kawasaki (JP); Kohji Inokawa, Kawasaki (JP); Yumi Eguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 433 days.

(21) Appl. No.: 12/638,245

(22) Filed: Dec. 15, 2009

(65) Prior Publication Data

US 2010/0167706 A1    Jul. 1, 2010

(30) Foreign Application Priority Data

Dec. 16, 2008  (JP) ................................ 2008-319453

(51) Int. Cl.
H04W 40/00 (2009.01)
H04W 72/00 (2009.01)
H04W 4/00 (2009.01)
H04L 12/28 (2006.01)
H04L 12/56 (2006.01)
G06F 15/177 (2006.01)

(52) U.S. Cl. ........ 455/445; 455/453; 455/466; 370/230; 370/395.2; 709/220

(58) Field of Classification Search .............. 455/414.1, 455/422.1, 445, 453, 466; 370/229, 230, 370/395.2, 432; 709/220, 222–229
See application file for complete search history.

(56) References Cited

U.S. PATENT DOCUMENTS

| 5,666,356 | A  | * | 9/1997  | Fleming et al. ............... 370/328 |
|-----------|----|---|---------|---------------------------------------|
| 6,331,983 | B1 | * | 12/2001 | Haggerty et al. ............. 370/400 |
| 7,173,904 | B1 | * | 2/2007  | Kim ............................. 370/230 |
| 8,135,120 | B2 | * | 3/2012  | Yasuda ......................... 379/196 |
| 2004/0048617 | A1 | | 3/2004 | Macarthur et al. |
| 2005/0027830 | A1 | | 2/2005 | Florkey et al. |
| 2006/0023733 | A1 | * | 2/2006 | Shimizu et al. ............... 370/432 |
| 2007/0160056 | A1 | | 7/2007 | Matsumoto et al. |
| 2007/0171823 | A1 | | 7/2007 | Hunt et al. |

FOREIGN PATENT DOCUMENTS

JP    2002-124949    4/2002

OTHER PUBLICATIONS

European Search Report dated Feb. 16, 2011 in corresponding European Patent Application 09179215.0.
U.S. Appl. No. 12/638,130, filed Dec. 15, 2009, Kazuyuki Ohtsu, Fujitsu Limited.

* cited by examiner

*Primary Examiner* — Wesley Kim
(74) *Attorney, Agent, or Firm* — Staas & Halsey LLP

(57) ABSTRACT

A mobile network system includes a guidance message control server, a call control server and access gateways. The call control server receives a call request notification from a first access gateway, determines whether a second access gateway is connected to a second mobile terminal, transmits a message transmission instruction to the guidance message control server and transmits a response message including a same group specifying information. The guidance message control server receives the message transmission instruction from the call control server, acquires guidance message data specified by a message specifying information and multicast transmits the guidance message data to a multicast group specified by the group specifying information. The first access gateway receives a call connection request from the first mobile terminal and transmits the call request notification to the call control server, performs multicast group participation processing for participating in the multicast group and transmits the guidance message data.

9 Claims, 15 Drawing Sheets

FIG. 3
Related Art

```
INVITE sip:User2@recv.example.com SIP/2.0                              ─ 301
Via: SIP/2.0/UDP cscf.example.com:5060
Max-Forwards: 70
From: User1 <sip:User1@send.example.com>; tag=98765                    ─ 302
To: User2 <sip:User2@recv.example.com>
Call-ID: 123456@send.example.com
CSeq: 1 INVITE
Contact: <sip:User1@send.example.com>
Content-Type: application/sdp                                          ─ 303
Content-Length: 149 v=0
o=User1 1158455190 1158455190 IN IP4 send.example.com
s=Session
c=IN IP4 192.168.100.100                                               ─ 304
t=0 0
m=audio 10000 RTP/AVP 0
a=rtpmap:0 PCMU/8000
```

FIG. 4
Related Art

```
INVITE sip:LGN@recv.example.com SIP/2.0                              ~401
Via: SIP/2.0/UDP cscf.example.com:5060
Max-Forwards: 70
From: User1 <sip:User1@send.example.com>; tag=98765                  ~402
To: LGN <sip:LGN@recv.example.com>
Call-ID: 123456@send.example.com
CSeq: 1 INVITE
Contact: <sip:User1@send.example.com>
Content-Type: application/sdp
Content-Length: 149                                                  ~403 v=0
o=User1 1158455190 1158455190 IN IP4 send.example.com                ~404
s=Session
c=IN IP4 192.168.100.100
t=0 0
m=audio 10000 RTP/AVP 0
a=rtpmap:0 PCMU/8000
```

FIG. 7

```
INVITE sip:LGN@recv.example.com SIP/2.0                    ⎫ 71
Via: SIP/2.0/UDP cscf.example.com:5060                     ⎫
Max-Forwards: 70                                           ⎪
From: User1 <sip:User1@send.example.com>; tag=98765        ⎪
To: LGN <sip:LGN@recv.example.com>                         ⎬ 72
Call-ID: 123456@send.example.com                           ⎪
CSeq: 1 INVITE                                             ⎪
Contact: <sip:User1@send.example.com>                      ⎪
Content-Type: application/sdp                              ⎭
Content-Length: 149                                        ⎫ 73 v=0                                                        ⎫
o=User1 1158455190 1158455190 IN IP4 send.example.com      ⎪
s=Session                                                  ⎪
c=IN IP4 239.1.1.1/255   ←MULTICAST GROUP INFORMATION      ⎬ 74
t=0 0                                                      ⎪
m=audio 50000 RTP/AVP 0   ←PORT NUMBER                     ⎪
a=rtpmap:0 PCMU/8000                                       ⎭
```

FIG. 8

```
SIP/2.0 503 Service Unavailable
Via: SIP/2.0/UDP agw#n@recv.example.com;branch=z9hG4bKhjhs8ass877
From: CSCF <sip:cscf@example.com>;tag=1928301774
To: <sip:agw#n@example.com>
Call-ID: a84b4c76e66710
CSeq: 15 INVITE
Content-Type: application/sdp
Content-Length: 0
Reason: Q850;cause=22;text="AGW is busy"
```

801
802

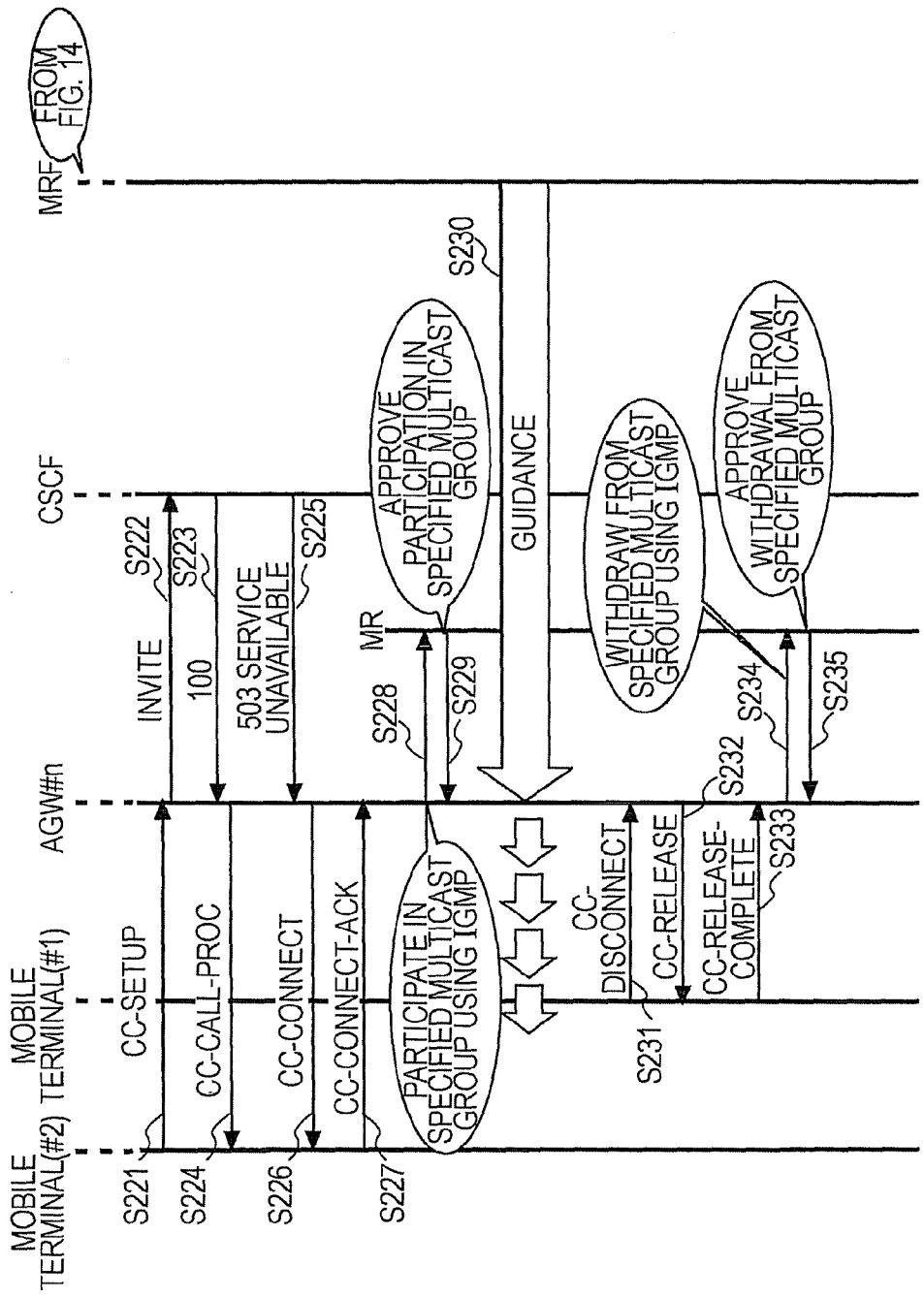

MOBILE NETWORK SYSTEM AND GUIDANCE MESSAGE PROVIDING METHOD

CROSS-REFERENCE TO RELATED APPLICATIONS

This application is based upon and claims the benefit of priority from the prior Japanese Patent Application No. 2008-319453 filed on Dec. 16, 2008, the entire contents of which are incorporated herein by reference.

BACKGROUND

1. Field

Embodiments of the present invention relate to a technique for providing a guidance message at the time of call restriction in a mobile network.

2. Description of the Related Art

At a place of an event such as a concert or a sporting event, since a plurality of persons send captured images using mobile telephones (mobile terminals), calls with high traffic tend to frequently occur. A similar tendency is observed at the source of a disaster such as an earthquake or a fire. Thus, if communication is centralized in such a narrow communication area, it may be difficult to connect a call sent from a mobile terminal placed in the communication area and connect a call to the mobile terminal. One of the reasons for this is the lack of communication resources required for each call.

In this case, a communication carrier provides a guidance message saying that "the line is very busy, please try your call later" for a mobile terminal that is the source of a call and restricts the call. Japanese Unexamined Patent Application Publication No. 2002-124949 discloses the related art.

SUMMARY

A mobile network system includes a guidance message control server, a call control server and a plurality of access gateways each of which is connected to a mobile terminal via a wireless base station.

The call control server includes a receiving section that receives from a first access gateway included in the plurality of access gateways a call request notification that a first mobile terminal has made a call request for a second mobile terminal, a determination section that determines whether a second access gateway that is included in the plurality of access gateways and is connected to the second mobile terminal specified in the call request notification received by the receiving section is call-restricted, an instructing section that transmits a message transmission instruction including message specifying information and group specifying information to the guidance message control server, and a response section that, in a case where the determination section determines that the second access gateway is call-restricted, transmits a response message including the same group specifying information as that included in the message transmission instruction to the first access gateway.

The guidance message control server includes an instruction receiving section that receives the message transmission instruction from the call control server, an acquisition section that acquires guidance message data specified by the message specifying information included in the message transmission instruction received by the instruction receiving section, and a transmission section that multicast transmits the guidance message data acquired by the acquisition section to a multicast group specified by the group specifying information included in the message transmission instruction received by the instruction receiving section.

The first access gateway includes a relay section that receives from the first mobile terminal via the wireless base station a call connection request for the second mobile terminal and transmits the call request notification to the call control server in response to the call connection request, a processing section that, in a case where the processing section receives the response message from the call control server, performs multicast group participation processing for participating in the multicast group specified by the group specifying information included in the response message, and a guidance transmission section that transmits the guidance message data that is received as a result of the multicast group participation processing performed by the processing section to the first mobile terminal.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

The above-described embodiments of the present invention are intended as examples, and all embodiments of the present invention are not limited to including the features described above.

BRIEF DESCRIPTION OF THE DRAWINGS

FIG. 3 illustrates an exemplary format of an INVITE message;

FIG. 4 illustrates an exemplary format of the INVITE message at the time of unicast connection of a guidance message;

FIG. 7 illustrates an exemplary format of an INVITE message transmitted from a CSCF server to a MRF server according to the first embodiment;

FIG. 8 illustrates an exemplary format of a first-type error message according to the first embodiment;

FIG. 15 illustrates the guidance message connection/disconnection process according to the second embodiment.

DETAILED DESCRIPTION OF THE PREFERRED EMBODIMENTS

Figure 1:
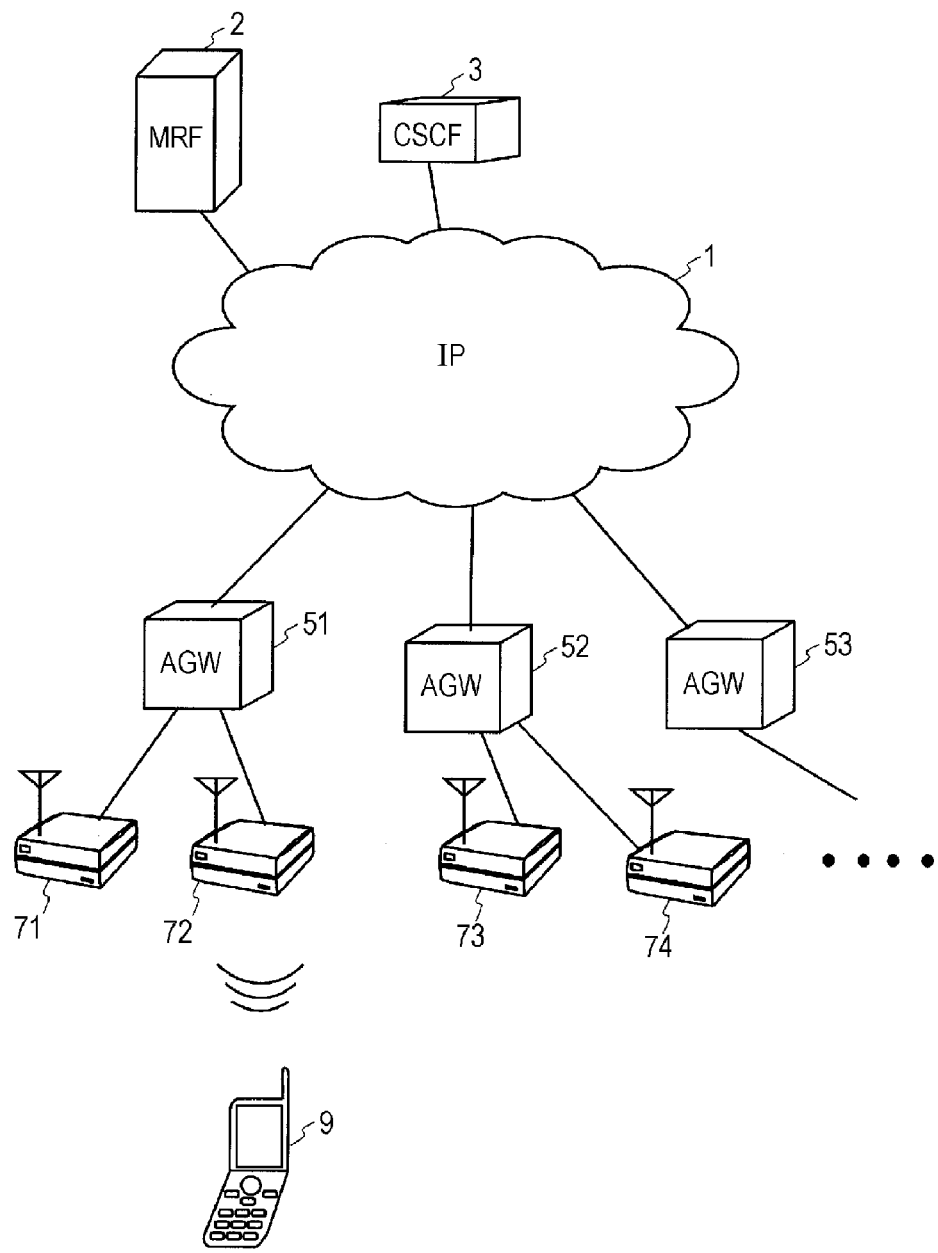
FIG. 1 illustrates a system configuration of a mobile network system.

Reference may now be made in detail to embodiments of the present invention, examples of which are illustrated in the accompanying drawings, wherein like reference numerals refer to like elements throughout.

A concrete example of a mobile network system according to an embodiment of the present invention will be described below. Embodiments to be described later are merely illustrative, and the present invention is not limited to configurations according to these embodiments.

[Related Art]

Before describing embodiments of the present invention, the related art will be described. FIG. 1 is a diagram illustrating a system configuration of a mobile network system in the related art. A mobile network system in the related art includes an Media Resource Control Function or Multimedia Resource Function (MRF) server 2, a Call Signaling Control Function (CSCF) server 3, an Access GateWay (AGW) servers 51, 52, 53, etc., a wireless base station apparatus (hereinafter also referred to as a "base station") 71, 72, 73, 74, etc. The MRF server 2, the CSCF server 3, and the AGW servers 51, 52, 53, etc. are connected to each other via an Internet Protocol (IP) network 1.

If a mobile terminal 9 accesses this mobile network system via a base station 71, 72, 73, 74, etc., it receives various communication services from the mobile network system. In the following, only guidance message providing services will be described. The guidance message providing services are services for providing various guidance messages to the mobile terminal 9 processed by a caller. In this embodiment, an exemplary case in which a guidance message is provided for a mobile terminal when the mobile terminal cannot receive a communication service due to call restriction will be described. These guidance message providing services include a service for automatically providing an audio response message in accordance with a number dialed by a caller.

The roles of nodes included in a mobile network system in the related art will be described below.

The MRF server 2 provides various guidance messages in response to a request transmitted from the CSCF server 3. For example, the MRF server 2 exchanges data with the CSCF server 3 using the Session Initiation Protocol (SIP) and transmits a guidance message using the Real-time Transport Protocol (RTP). SIP is a text-based protocol, and uses the Uniform Resource Identifiers (URIs) to designate addresses of a communication destination and a communication source. RTP is a protocol used on the User Datagram Protocol (UDP), and is mainly used for real-time data transmission. The guidance message is registered in advance in the MRF server 2 as message data, and is, for example, a message saying that "the line is very busy, please try your call later".

The CSCF server 3 has an SIP server function, and performs call control for the mobile terminal 9. Furthermore, the CSCF server 3 manages the load on the AGW servers 51, 52, 53, etc. and performs call restriction upon the AGW servers 51, 52, 53, etc. in accordance with the load. If the AGW servers 51, 52, 53, etc. connected to a mobile terminal that is the destination of a call request is set as a subject of call restriction, the CSCF server 3 instructs the MRF server 2 to connect a call for the mobile terminal connected to the AGW servers 51, 52, 53, etc. or a call generated from the mobile terminal to a predetermined guidance message. Call control functions possessed by the CSCF server 3 are defined as three functions, the Serving Call Session Control Function (S-CSCF), the Interrogating Call Session Control Function (I-CSCF), and the Proxy Call Session Control Function (P-CSCF) in the IP Multimedia Subsystem (IMS) specified by the 3rd Generation Partnership Project (3GPP).

The AGW servers 51, 52, 53, etc. has a function of terminating Radio Access Network (RAN) communication that is performed with the mobile terminal 9 via the base station 71, 72, 73, 74, etc. subordinated thereto. The AGW servers 51, 52, 53, etc. may be connected to the base station 71, 72, 73, 74, etc. using IP or the Asynchronous Transfer Mode (ATM). In RAN, for example, the Call Control (CC) protocol specified by the International Mobile Telecommunication (IMT)-2000 is executed.

Furthermore, the AGW servers 51, 52, 53, etc. is connected to the IP network 1, and has a function of terminating the Voice over Internet Protocol (VoIP) executed on the IP network 1. If the AGW servers 51, 52, 53, etc. receives a call from the mobile terminal 9 via the base station 71, 72, 73, 74, etc. subordinated thereto using the CC protocol, it performs a predetermined procedure with the CSCF server 3 using SIP. The predetermined procedure is, for example, the registration of the position of the mobile terminal 9 in the CSCF server 3. If the call is connected between the mobile terminal 9 and another mobile terminal under the control of the CSCF server 3, the AGW servers 51, 52, 53, etc. relays between RAN and VoIP data of communication between these mobile terminals. In this embodiment, in order to focus attention on the transfer of a guidance message, the detailed description of other transfer functions of the AGW servers 51, 52, 53, etc. will be omitted.

The base station 71, 72, 73, 74, etc. is wirelessly connected to the mobile terminal 9. The base station 71, 72, 73, 74, etc. wirelessly receives data from the mobile terminal 9 and transfers the received data to the AGW servers 51, 52, 53, etc. via RAN. In contrast, the base station 71, 72, 73, 74, etc. receives data from the AGW servers 51, 52, 53, etc. via RAN and wirelessly transfers the received data to the mobile terminal 9. Communications performed in this embodiment are not limited to the communication between the AGW servers 51, 52, 53, etc. and the base station 71, 72, 73, 74, etc. and the wireless communication between the base station 71, 72, 73, 74, etc. and the mobile terminal 9, and the descriptions thereof are therefore simplified.

[Guidance Message Unicast Connection]

Figure 2:
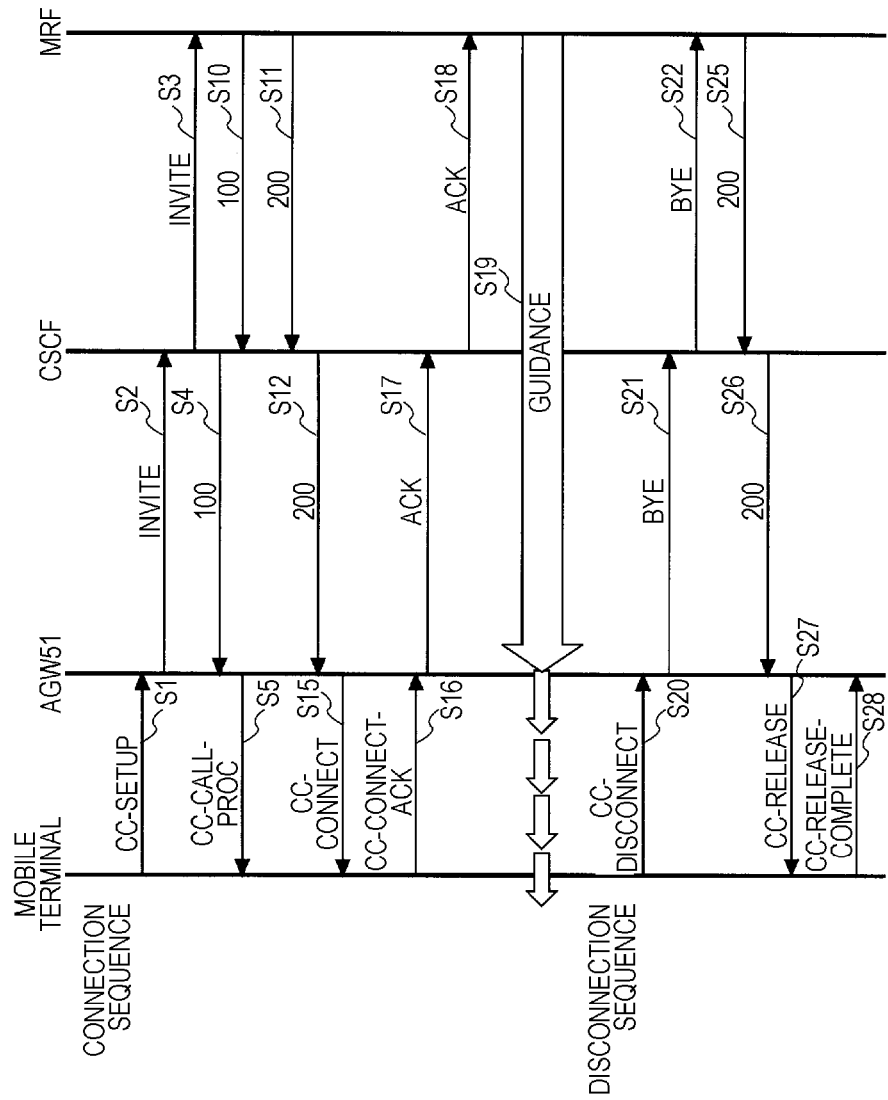
FIG. 2 illustrates a guidance message unicast connection process.

A guidance message unicast connection process in the related art will be described below with reference to FIG. 2. FIG. 2 is a sequence chart illustrating a guidance message unicast connection process in the related art.

If the mobile terminal 9 originates a call, the connection between the AGW server 51 and the mobile terminal 9 is established via the base station 72 that is determined in accordance with the position of the mobile terminal 9 using the Radio Resource Control Protocol (RRC), the Mobility Management Protocol (MM), etc. If the connection between the AGW server 51 and the mobile terminal 9 is established as described previously, the mobile terminal 9 transmits a SETUP message (CC-SETUP) to the AGW server 51 via the base station 72 (S1). In the CC protocol, the SETUP message indicates that the mobile terminal 9 has originated a call. Referring to FIG. 2, "CC-" is added to a CC protocol message. Upon receiving the SETUP message, the AGW server 51 transmits an SIP INVITE message to the CSCF server 3 (S2). The INVITE message is an SIP message used to start a call session.

FIG. 3 is a diagram illustrating an exemplary format of an INVITE message. As illustrated in FIG. 3, an SIP message includes a request line 301, a header part 302, empty line 303 and a body part 304. In the request line, INVITE denoting the type of a request, sip:User2@recv.example.com that is the URI of a destination of the request, SIP/2.0 denoting an SIP version, etc. are set. For example, a telephone number of a destination of a call request included in the SETUP message is set as User2 included in the URI.

In the header part, the following data may be set. In the Via field, an SIP version, a protocol type, the URI (cscf.example.com) of the CSCF server 3 functioning as a relay apparatus, and the number (5060) of a used port are set. In the From field, the URI (User1@send.example.com) of a caller and the tag (98765) of the caller are set. For example, the telephone number of the caller included in the SETUP message is set as User1 included in the URI of the caller. In the To field, the URI of the destination of the call request is set. In the Call-ID field, identification information (hereinafter also referred to as a call ID) used to identify a call is set. In the Contact field, the URI of a source of data set in the body part is set. In the Content-Type field, the type of the body part is set. In the Content-Length field, the size of the body part is set. In an example illustrated in FIG. 3, the Session Description Protocol (SDP) is set as the type of the body part.

In the body part, a protocol version may be set in the v field, session identification information may be set in the o field, a session name may be set in the s field, connection information may be set in the c field, session time information may be set in the t field, media information may be set in the m field, and attribute information may be set in the a field. In this example in which a call is requested, in the m field, audio may be set as a media type, 10000 may be set as the port number of a destination of the media may be set, and RTP/AVP (AudioNideo Profile) may be set as a protocol. Contents that have not been described are specified by RFC3261, RFC2327, etc. standardized by the Internet Engineering Task Force (IETF).

Upon receiving the INVITE message from the AGW server 51 (S2), the CSCF server 3 extracts information about the destination of the call request from the INVITE message. For example, the information about the destination of the call request is acquired from a request line of the INVITE message. The CSCF server 3 searches for the AGW server connected to a mobile terminal that is the destination of the call request on the basis of the information (User2) about the destination of the call request. For example, the CSCF server 3 determines that the AGW server connected to a mobile terminal that is the destination of the call request is the AGW server 53.

The CSCF server 3 checks the load on the AGW server 53. In this example, it is assumed that the CSCF server 3 sets the AGW server 53 as a subject of call restriction since a call transmitted to the mobile terminal 9 that is wirelessly connected to the base station 7 subordinated to the AGW server 53 and a call transmitted from the mobile terminal 9 frequently occur. If the CSCF server 3 determines that the AGW server 53 is call-restricted, it determines that the call should be connected to a guidance message and acquires identification information (hereinafter referred to as a Logical Guidance Number (LGN)) specifying the guidance message. In this example, an LGN denoting a call restriction guidance message included in a plurality of guidance messages is acquired. The CSCF server 3 resets the LGN as information about the destination of the call request which may be set in the INVITE message, and transmits the INVITE message to the MRF server 2 (S3).

FIG. 4 is a diagram illustrating an exemplary format of the INVITE message at the time of unicast connection of a guidance message including a request line 401, a header part 402, an empty line 403, and a body part 404. As illustrated in FIG. 4, in the INVITE message transmitted from the CSCF server 3 to the MRF server 2, the information (User2) about the destination of the call request illustrated in FIG. 3 is changed to LGN.

The CSCF server 3 transmits the INVITE message to the MRF server 2 (S3) and transmits a TRYING (100) message back to the AGW server 51 (S4). The TRYING (100) message is a response message that notifies a source of the INVITE message that the INVITE message has been received and processing is being performed.

Upon receiving the TRYING message from the CSCF server 3 using SIP (S4), the AGW server 51 transmits a CALL-PROCEEDING message (CC-CALL-PROC) to the mobile terminal 9 using the CC protocol (S5). Upon receiving the CALL message, the mobile terminal 9 recognizes that a call destination has started to be called and processing is being performed.

Upon receiving the INVITE message from the CSCF server 3 (S3), the MRF server 2 transmits the TRYING (100) message back to the CSCF server 3 (S10). The MRF server 2 acquires a guidance message corresponding to the LGN extracted from the INVITE message. For example, the guidance message is data that is digitalized by an audio CODEC and is then stored in the MRF server 2 in advance. If the MRF server 2 acquires the guidance message data, it transmits an OK (200) message to the CSCF server 3 (S11). In usual call connection, a mobile terminal transmits this OK message to a server so as to notify the server that it has received a call. However, in the case of the guidance message, since a receiver is not present, the OK message is transmitted immediately after the TRYING message has been transmitted. Upon receiving the OK message (S11), the CSCF server 3 transfers the OK message to the AGW server 51 (S12).

Upon receiving the OK message from the CSCF server 3 (S12), the AGW server 51 transmits a CONNECT message (CC-CONNECT) to the mobile terminal 9 using the CC protocol (S15). The AGW server 51 receives a CONNECT-ACK message (CC-CONNECT ACKNOWLEDGE) that is transmitted from the mobile terminal 9 in response to the CONNECT message (S16). As a result, the wireless access connection between the AGW server 51 and the mobile terminal 9 is established. Upon receiving the CONNECT-ACK message (S16), the AGW server 51 transmits an ACK message to the CSCF server 3 using SIP (S17). The CSCF server 3 transfers the ACK message to the MRF server 2 (S18). Instead of the CONNECT message (CC-CONNECT) and the CONNECT-ACK message (CC-CONNECT ACKNOWLEDGE), a PROGRESS message (CC-PROGRESS) and a PROGRESS-ACK message (CC-PROGRESS ACKNOWLEDGE) may be used. It may be determined which of a CONNECT message and a PROGRESS message should be used in accordance with the type (pay/free) of a provided guidance message.

Upon receiving the ACK message (S18) from the CSCF server 3 after transmitting the OK message to the CSCF server 3 (S11), the MRF server 2 transmits a guidance message to the AGW server 51 connected to the mobile terminal 9 that is the source (caller) of the call request using RTP (S19). At that time, as the IP address of the destination of the guidance message packet, the IP address (unicast address) of the AGW server 51 may be set. Upon receiving the guidance message, the AGW server 51 transmits the guidance message to the mobile terminal 9 possessed by the caller via the base station 72. As a result, the caller using the mobile terminal 9 listens to the guidance message saying that "the line is very busy, please try your call later".

Next, the disconnection of the call performed by the mobile terminal 9 that has received the guidance message will be described.

The mobile terminal 9 transmits a DISCONNECT message (CC-DISCONNECT) to the AGW server 51 using the CC protocol (S20). The DISCONNECT message is a message requesting the release of the wireless access connection. Upon receiving the DISCONNECT message, the AGW server 51 transmits a BYE message to the CSCF server 3 using SIP (S21). The BYE message is a message requesting the termination of the call, and is used to terminate the session.

Upon receiving the BYE message from the AGW server 51, the CSCF server 3 acquires information about the destination of the call to be released and information about the caller. For example, the CSCF server 3 acquires the URI of the destination of the call set in a request line included in the BYE message as the information about the destination of the call, and acquires the information about the caller from the From field included in the header part of the Bye message. In this example, the CSCF server 3 acquires User2 as the information about the destination of the call and User1 as the information about the caller. Since the CSCF server 3 recognizes that a guidance message is connected to the call between User1 and User2, it changes the information about the destination of the call to LGN denoting the guidance message in the BYE message and then transmits the BYE message to the MRF server 2 (S22).

Upon receiving the BYE message from the CSCF server 3, the MRF server 2 stops the transmission of the guidance message to the caller (User1) represented by the information about the caller included in the received BYE message. Subsequently, the MRF server 2 transmits an OK (200) message back to the CSCF server 3 (S25). Upon receiving the OK message, the CSCF server 3 transfers the OK message to the AGW server 51 (S26).

Upon receiving the OK message from the CSCF server 3, the AGW server 51 transmits a RELEASE message (CC-RELEASE) to the mobile terminal 9 using the CC protocol (S27). Upon receiving the RELEASE message, the mobile terminal 9 releases a resource used for the call. Subsequently, the mobile terminal 9 transmits a RELEASE-COMPLETE message (CC-RELEASE-COMPLETE) to the AGW server 51 (S28). As a result of the above-described communication sequence, the established call connection between the mobile terminal 9 and the guidance message is released.

Thus, conventionally in the guidance message unicast connection process, calls originated from mobile terminals are individually provided with communication resources, and a guidance message is transmitted to the mobile terminals using the provided communication resources. That is, each of calls for a mobile terminal connected to the call-restricted AGW server is connected to a guidance message. Accordingly, if the number of calls for the mobile terminal connected to the call-restricted AGW server is increased, the traffic of a mobile network is further increased and the processing load on the AGW server, the CSCF server 3, and the MRF server 2 which perform processing for connecting a call and a guidance message is also increased.

[First Embodiment]

A mobile network system according to the first embodiment will be described below. A mobile network system according to the first embodiment differs from a mobile network system in the above-described related art in that a guidance message is multicast transmitted from the MRF server 502. A mobile network system according to the first embodiment will be described in detail below focusing on the differences from a mobile network system in the related art.

[System Configuration]

Figure 5:
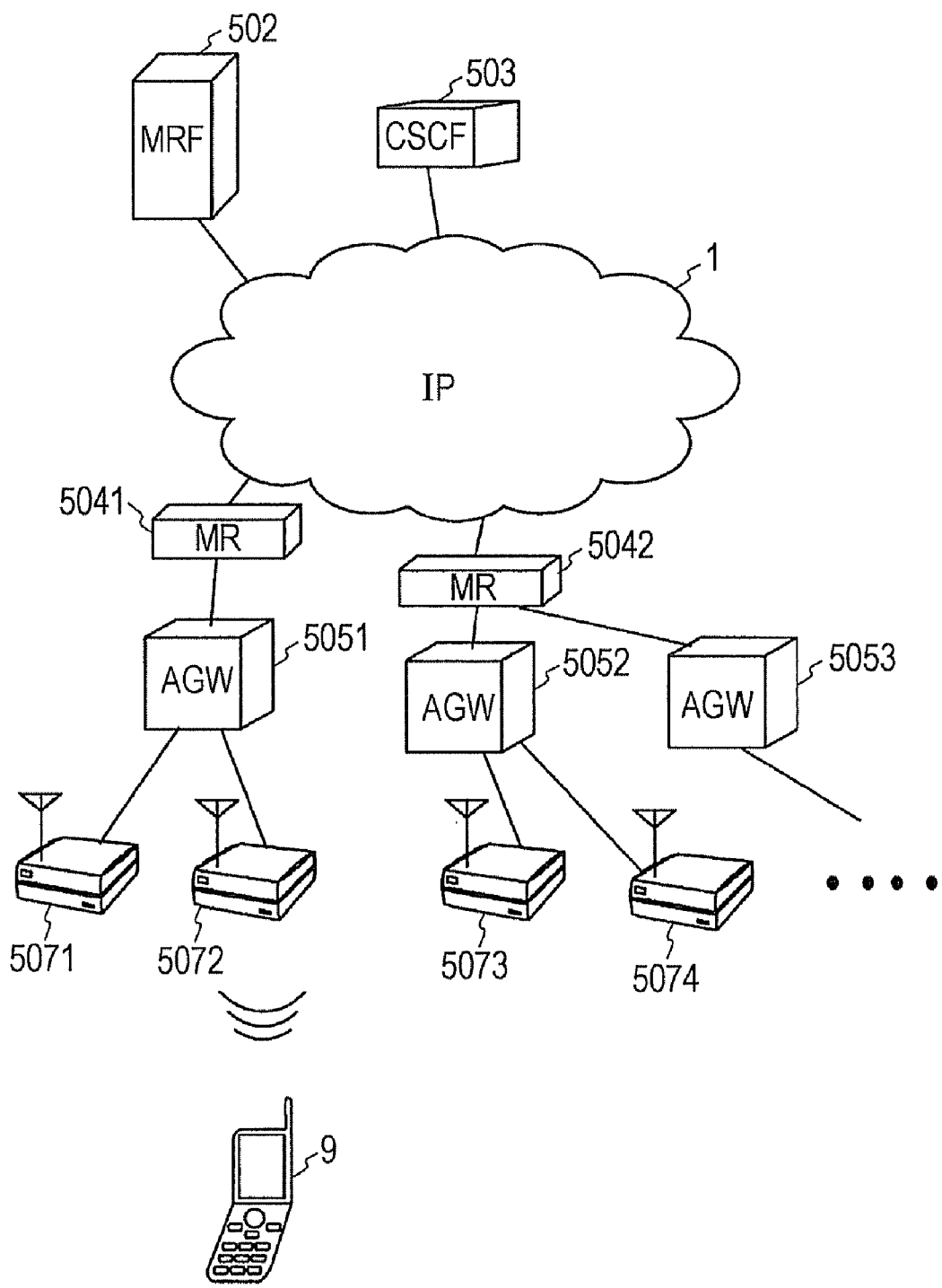
FIG. 5 illustrates a system configuration of a mobile network system.

FIG. 5 is diagram illustrating a system configuration of a mobile network system (hereinafter also referred to as a system) according to the first embodiment. A system according to the first embodiment further includes Multicast Routers (MR) 5041 and 5042 in addition to the components included in the above-described mobile network system in the related art. In a system according to the first embodiment, the MRF server 502, the CSCF server 503, and the MR 5041, 5042 are connected to each other via the IP network 1.

[Apparatus Configuration]

The MR 5041, 5042 is a router applicable to multicast communication. The MR 5041, 5042 has a known function of routing an IP packet and a function of rouging a multicast packet for which a multicast address is set. More specifically, the MR 5041, 5042 functions as a router for connecting the AGW servers 5051, 5052, 5053, etc. to the IP network 1, and multicasts a multicast packet received from the IP network 1 to the AGW servers 5051, 5052, 5053, etc. that are connected thereto and are included in a multicast group of the multicast packet. The MR 5041, 5042 receives from the AGW server an application for participation in a specific multicast group and an application for withdrawal from the specific multicast group using the Internet Group Management Protocol (IGMP), and manages pieces of information about these applications. Referring to FIG. 5, the MR 5041 is connected to the AGW server 5051, and the MR 5042 is connected to the AGW server 5052 and the AGW server 5053. The participation/withdrawal in/from a multicast group in IGMP is specified by RFC1112, RFC2236, RFC3376, etc., and the description thereof will be omitted. This embodiment does not limit the version of IGMP.

Figure 6:
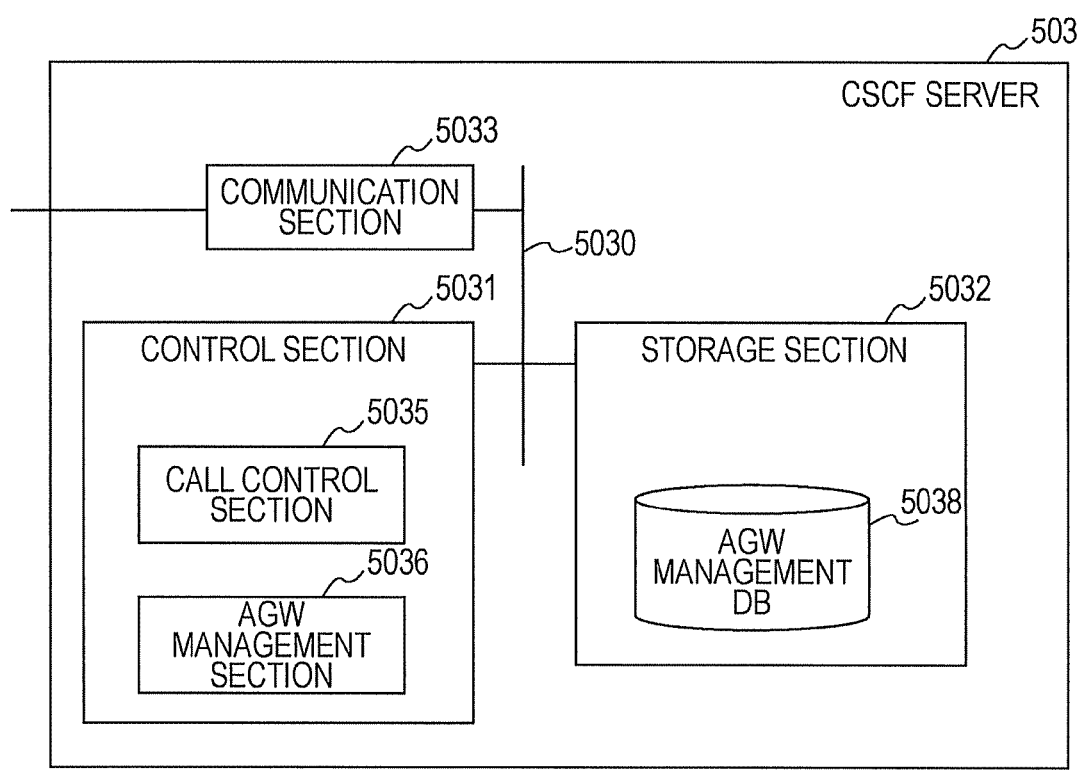
FIG. 6 illustrates a construction of a CSCF server.

FIG. 6 is a block diagram illustrating a construction of a CSCF server according to the first embodiment. The CSCF server 503 according to the first embodiment includes a control section 5031, a storage section 5032, a communication section 5033, etc. The control section 5031, the storage section 5032, and the communication section 5033 are connected to each other via, for example, a bus 5030. Each of these sections is achieved by software components, hardware components, or the combination of the software components and the hardware components (see, a section "Others").

The storage section 5032 stores an AGW management database (DB) 5038. The AGW management DB 5038 stores address information of each of the AGW servers 5051, 5052, and 5053, information about the mobile terminal 9 connected to each of the AGW servers 5051, 5052, and 5053, and load information of each of the AGW servers 5051, 5052, and 5053. The information about the mobile terminal 9 connected to each of the AGW servers 5051, 5052, and 5053 is acquired using, for example, an SIP REGISTER message, and includes, for example, a telephone number. The load information of each of the AGW servers 5051, 5052, and 5053 may be acquired using a standard message such as an SIP message or a Simple Network Management Protocol (SNMP) message, or may be acquired from the AGW server using a unique communication message. For example, as the load information, the number of established call connections may be used instead of the load information of a processor.

The communication section 5033 includes a communication interface board (not illustrated), and performs SIP communication etc. The control section 5031 includes a call control section 5035 and an AGW management section 5036. The call control section 5035 performs call processing on the basis of an SIP message transmitted via the communication section 5033. The AGW management section 5036 manages the load on the AGW server.

The AGW management section 5036 acquires the load information of the AGW server and stores the acquired load information in the AGW management DB 5038. If the load on the AGW server exceeds a predetermined load, the AGW management section 5036 determines that call restriction should be performed upon the AGW server and stores data indicating that call restriction is being performed in the AGW management DB 5038. The AGW server may determine whether call restriction should be performed and notify the AGW management section 5036 of a result of the determination. On the other hand, if the load on the call-restricted AGW server falls below the predetermined load, the AGW management section 5036 determines to remove the call restriction. The AGW management section 5036 may be notified of the removal of the call restriction by the AGW server.

If the call control section 5035 determines the AGW server to be call-restricted, it transmits an INVITE message to the MRF server 502 so as to cause the MRF server 502 to multicast transmit a guidance message. The call control section 5035 may detect the AGW server to be call-restricted periodically or at the time of receiving the load information of the AGW server. The INVITE message includes an LGN specifying a guidance message, and a multicast address and a port number which are used for transmission of a guidance message. The call control section 5035 may determine LGNs so that a guidance message that is provided in response to a call connection request from the mobile terminal 9 connected to the call-restricted AGW server and a guidance message that is provided in response to a call connection request for the mobile terminal 9 connected to the call-restricted AGW server differ from each other.

FIG. 7 is a diagram illustrating an exemplary format of an INVITE message according to the first embodiment including a request line 71, a header part 72, and empty line 73, and a body part 74 transmitted from the CSCF server 503 to the MRF server 502. As illustrated in FIG. 7, in the first embodiment, in the body part of the INVITE message, a multicast address may be set for connection information (the c field) and a port number used for multicast transmission may be set for media information. The LGN is the same as that included in an INVITE message in the above-described related art.

Upon receiving an INVITE message from the AGW server, the call control section 5035 transmits a TRYING (100) message back to the AGW server and performs call connection between the mobile terminal 9 that is the destination of the call request included in the INVITE message and the mobile terminal 9 that is the source of the call request included in the INVITE message. However, if the call control section 5035 determines that the mobile terminal 9 that is the destination of the call request included in the INVITE message is connected to the call-restricted AGW server, it transmits an SIP error message (503 Service Unavailable) back to the AGW server.

Figure 9:
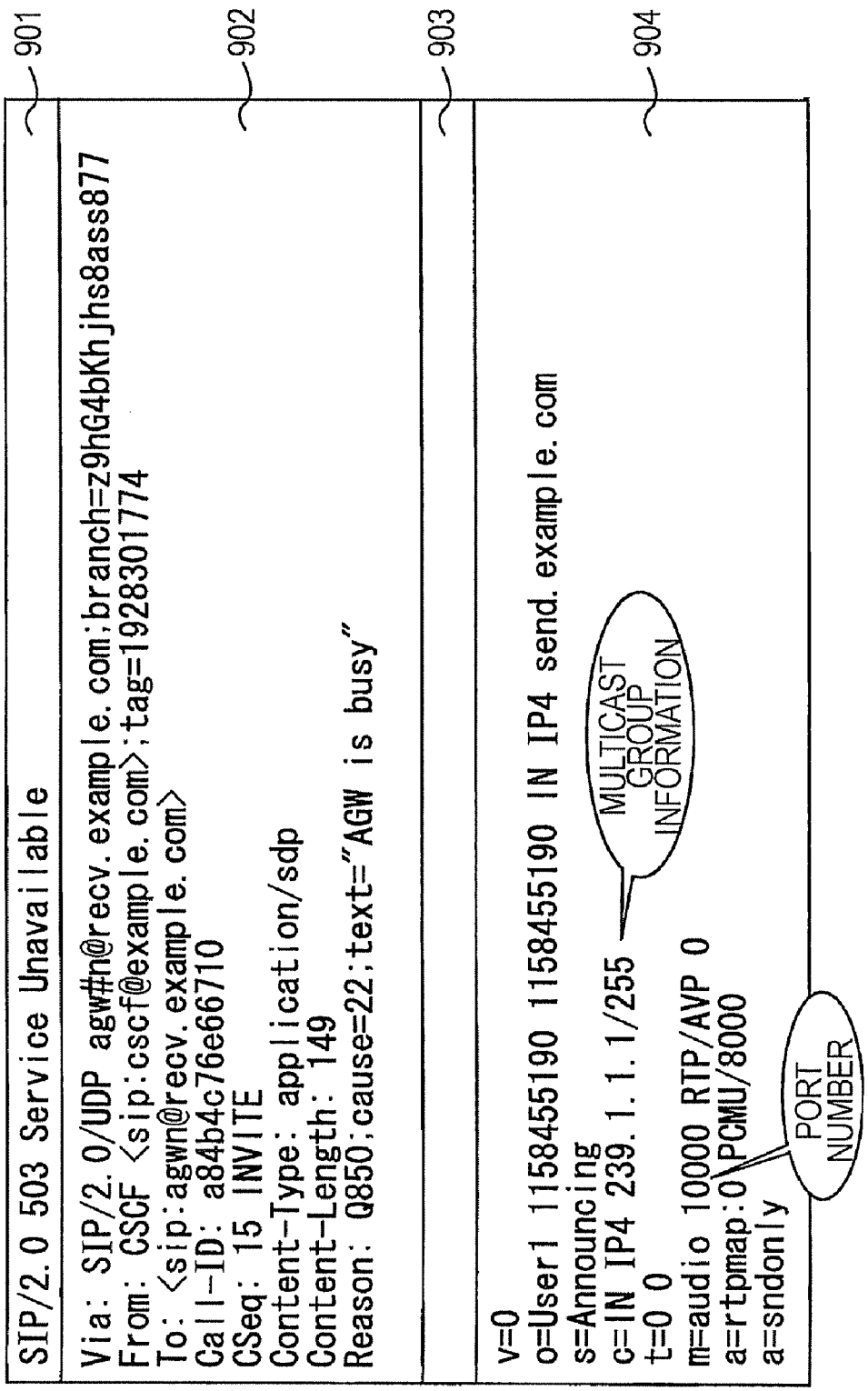
FIG. 9 illustrates an exemplary format of a second-type error message according to the first embodiment.

FIG. 8 is a diagram illustrating an exemplary format of a first-type SIP error message (503 Service Unavailable). FIG. 9 is a diagram illustrating an exemplary format of a second-type SIP error message (503 Service Unavailable). As described previously, if the call control section 5035 determines that the mobile terminal 9 that is the destination of the call request included in the INVITE message is connected to the call-restricted AGW server, it transmits the second-type SIP error message illustrated in FIG. 9 back to the AGW server. On the other hand, if the call control section 5035 determines that the call cannot be connected to a guidance message for some reason, for example, in a case where the MRF server 502 cannot multicast transmit a guidance message due to failure, it may transmit the first-type error message illustrated in FIG. 8 back to the AGW server.

As illustrated in FIGS. 8 and 9, in the error message, data of text "503 Service Unavailable" is included in the response line 801, text data indicating that the error message is an error response to the INVITE message may be set in the Cseq field of the header part 802, and text data (AGW is busy) indicating the cause of an error may be set in the Reason field. The first-type error message and the second-type error message are distinguished from each other by the presence of the body part. In the first-type error message, a value of zero may be set in the Content-Length field of the header part 802, and the body part is not included. On the other hand, in the second-type error message, a value equal to or larger than 1 may be set in the Content-Length field of the header part 902 and the body part 904 is included. In the body part 904 included in the second-type error message, a multicast address and a port number are set.

The second-type error message generated by the call control section 5035 includes the same multicast address and the same port number as those included in the INVITE message transmitted to the MRF server 502.

If there is no AGW to be call-restricted, the call control section 5035 transmits an SIP BYE message to the MRF server 502 so as to cause the MRF server 502 to terminate the multicast transmission of the guidance message.

Figure 10:
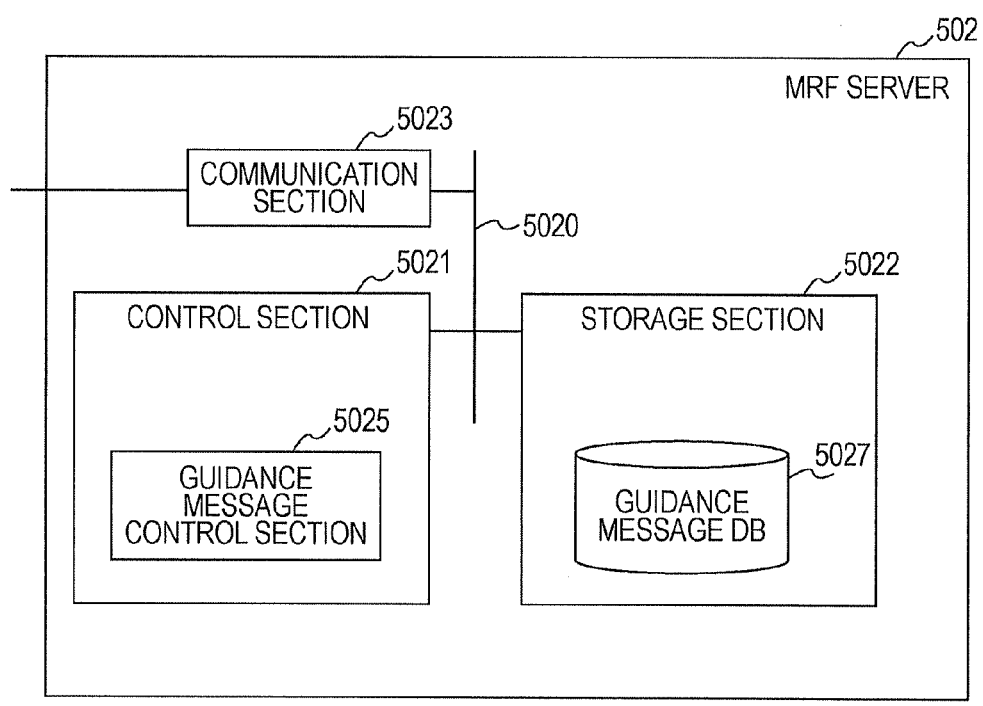
FIG. 10 illustrates a construction of an MRF server.

FIG. 10 is a block diagram illustrating a construction of an MRF server according to the first embodiment. The MRF server 502 according to the first embodiment includes a control section 5021, a storage section 5022, a communication section 5023, etc. The control section 5021, the storage section 5022, and the communication section 5023 are connected to each other via, for example, a bus 5020. Each of these sections is achieved by software components, hardware components, or the combination of the software components and the hardware components (see, the section "Others").

The storage section 5022 stores a guidance message database (DB) 5027. The guidance message DB 5027 stores an LGN and message data digitalized by an audio CODEC or the like for each guidance message. Each guidance message may be fixed data or changeable data. For example, if a guidance message update processing section (not illustrated) receives the change in the state of a call-restricted AGW, it may update corresponding guidance message data in accordance with the change in the sate of the AGW. For example, if the load on the call-restricted AGW is reduced, the guidance message saying that "the line is very busy, please try your call later" may be updated to a guidance message saying that "the situation is improving, but the line is still busy, please try your call later".

The communication section 5023 includes a communication interface board (not illustrated), and performs SIP communication, RTP communication, etc.

The control section 5021 includes a guidance message control section 5025. The guidance message control section 5025 acquires the LGN, the multicast address, and the port number included in the INVITE message transmitted from the CSCF server 503 to the communication section 5023. For example, referring to FIG. 7, the LGN is acquired from the request line 71, the multicast address is acquired from the connection information (the c field) of the body part 74, and the port number is acquired from the media information (the m field) of the body part 74.

The guidance message control section 5025 extracts message data corresponding to the acquired LGN from the guidance message DB 5027, and multicast transmits the extracted message data using RTP. At that time, the acquired multicast address and the acquired port number are set in an RTP packet. For example, the multicast transmission of a guidance message is periodically performed.

On the other hand, if the communication section 5023 receives a BYE message from the CSCF server 3, the guidance message control section 5025 terminates the multicast transmission of a corresponding guidance message.

Figure 11:
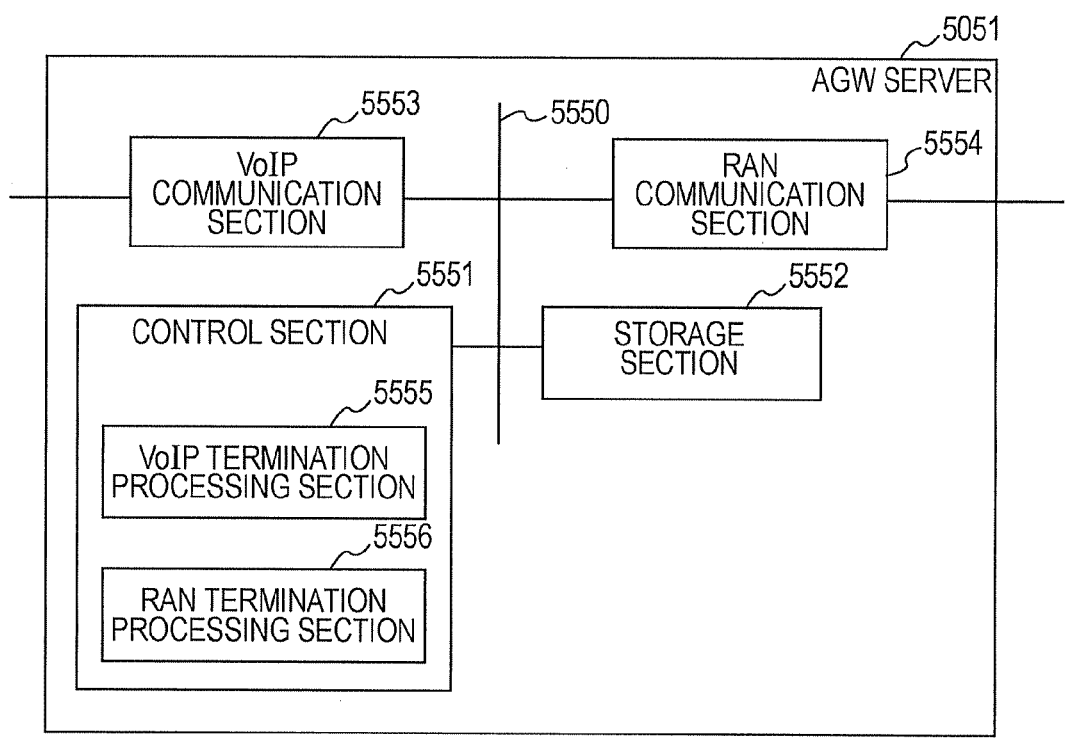
FIG. 11 illustrates a construction of an AGW.

FIG. 11 is a block diagram illustrating a construction of an AGW according to the first embodiment. The AGW server 5051 according to the first embodiment includes a control section 5551, a storage section 5552, a VoIP communication section 5553, a RAN communication section 5554, etc. The control section 5551, the storage section 5552, the VoIP communication section 5553, and the RAN communication section 5554 are connected to each other via, for example, a bus 5550. Each of these sections is achieved by software components, hardware components, or the combination of the software components and the hardware components (see, the section "Others").

The AGW server according to the first embodiment is connected to the IP network 1 via the MR 5041, 5042. Accordingly, the VoIP communication section 5553 includes a communication interface board (not illustrated) for accommodating a communication line connected to the MR 5041, 5042, and performs VoIP communication via the MR 5041, 5042 using SIP, RTP, etc. Furthermore, the VoIP communication section 5553 transmits/receives an IGMP message to/from the MR 5041, 5042. The RAN communication section 5554 includes a communication interface board (not illustrated) for accommodating a communication line connected to the base station 71, 72, 73, 74, etc. subordinated thereto, and performs RAN communication with the mobile terminal 9 via the base station 71, 72, 73, 74, etc. using the CC protocol etc.

The control section 5551 includes a VoIP termination processing section 5555 and a RAN termination processing section 5556.

The VoIP termination processing section 5555 terminates VoIP communication performed by the VoIP communication section 5553. More specifically, upon receiving an error message (503 Service Unavailable) from the CSCF server 503 after receiving a TRYING (100) message as a response to the INVITE message, the VoIP termination processing section 5555 determines whether the error message is a first-type error message or a second-type error message by referring to the Content-Type field and Content-Length field of the header part of the error message. If the value of the Content-Length field is equal to or larger than 1 and sdp is set in the Content-Type field as illustrated in FIG. 9, the VoIP termination processing section 5555 determines that the error message is a second-type error message.

If the VoIP termination processing section 5555 determines that the received error message is a second-type error message, it acquires a multicast address and a port number from the body part of the error message and transmits an application for participation in the multicast address to the MR 5041, 5042 using IGMP. After that, the VoIP communication section 5553 receives a guidance message multicast transmitted from the MRF server 502. Upon receiving the guidance message data, the VoIP termination processing section 5555 transmits the guidance message data to the RAN termination processing section 5556. On the other hand, if the VoIP termination processing section 5555 is notified that the wireless access connection between the AGW server and the mobile terminal 9 call-connected to a guidance message is disconnected by the RAN termination processing section 5556, it transmits an application for withdrawal from the multicast address to the MR 5041, 5042 using IGMP.

If the VoIP termination processing section 5555 determines that the received error message is a first-type error message, it may use the guidance message unicast connection method in the related art.

The RAN termination processing section 5556 terminates RAN communication that is performed by the RAN communication section 5554 using the CC protocol etc. More specifically, upon receiving a SETUP message from the mobile terminal 9, the RAN termination processing section 5556 transmits to the VoIP termination processing section 5555 call request destination information (telephone number), call request source information (telephone number), and call identification information (Call-ID). As a result, an SIP INVITE message is transmitted from the VoIP termination processing section 5555 to the CSCF server 503.

Furthermore, if the RAN termination processing section 5556 is notified by the VoIP termination processing section 5555 that the TRYING (100) message has been received as a response to the INVITE message, it transmits a CALL-PROCEEDING message to the mobile terminal 9. If the RAN termination processing section 5556 is notified by the VoIP termination processing section 5555 that the error message (503 Service Unavailable) has been received, it transmits a CONNECT message (CC-CONNECT) to the mobile terminal 9. If the RAN termination processing section 5556 receives a CONNECT-ACK message as a response to the CONNECT message, it instructs the VoIP termination processing section 5555 to perform processing for participating in a multicast address. If the VoIP termination processing section 5555 performs the processing for participating in a predetermined multicast address, the RAN termination processing section 5556 transmits a guidance message transmitted from the VoIP termination processing section 5555 to the mobile terminal 9.

[Exemplary Operation]

Figure 12:
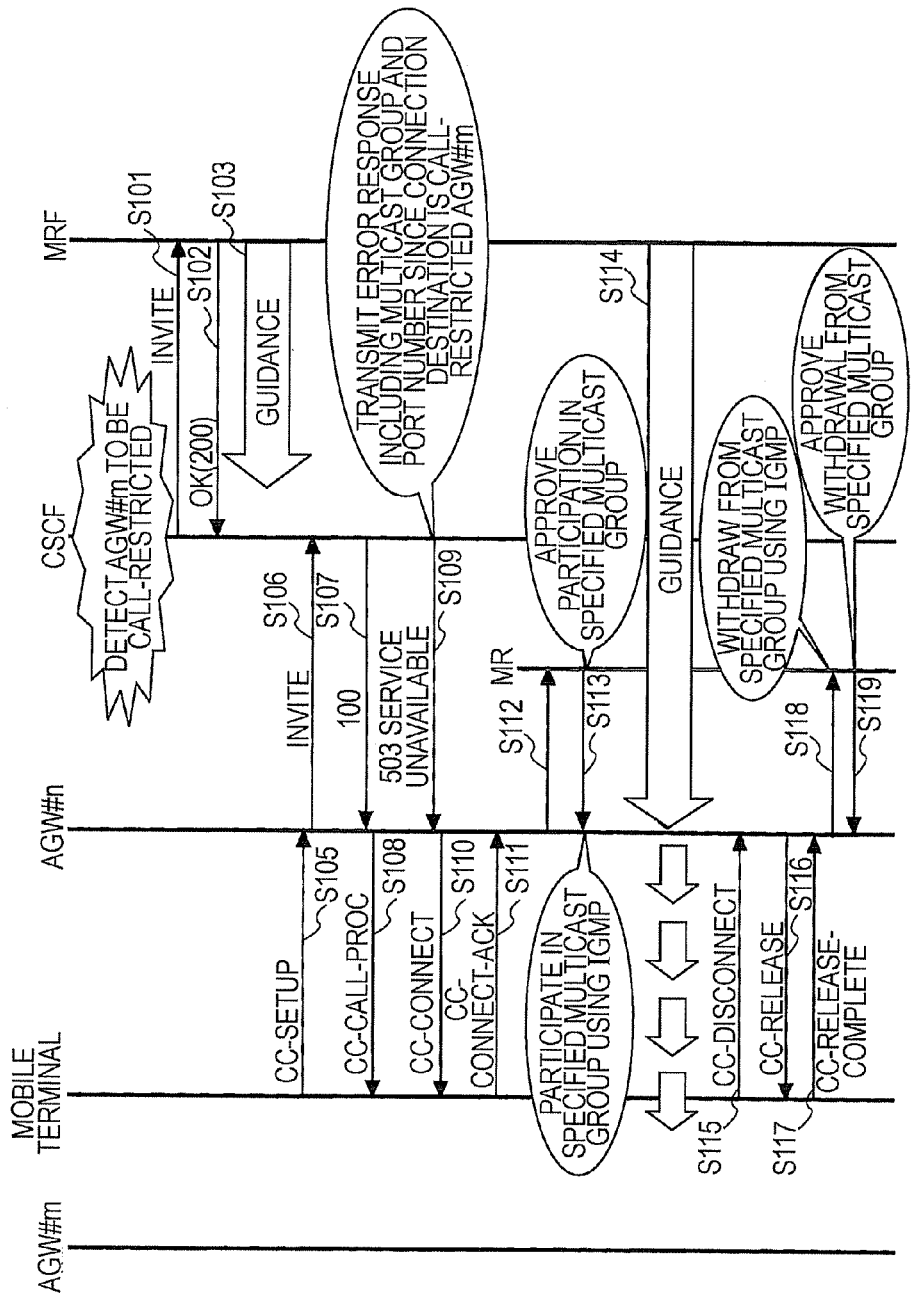
FIG. 12 illustrates a guidance message connection/disconnection process according to the first embodiment.

An exemplary operation of a mobile network system according to the first embodiment will be described below. FIG. 12 is a sequence chart illustrating a guidance message connection/disconnection process according to the first embodiment.

If the CSCF server 503 detects the AGW server on which a load exceeding a predetermined load is applied, it determines that the detected AGW server should be call-restricted. In this example, the AGW server 5 (#m) is set as a subject of call restriction, where "AGW server 5 (#m)" indicates one of AGW 5051, 5052, 5053 and is also abbreviated as "AGW #m" as depicted in FIG. 12. After setting the AGW server 5 (#m) as a subject of call restriction, the CSCF server 503 determines an LGN denoting a corresponding guidance message, a multicast address, and a port number. The CSCF server 503 generates an INVITE message including the LGN, the multicast address, and the port number (see, FIG. 7) and transmits the INVITE message to the MRF server 502 (S101).

Upon receiving the INVITE message, the MRF server 502 extracts the LGN, the multicast address, and the port number from the INVITE message and stores them. The MRF server 502 transmits an OK (200) message back to the CSCF server 3 (S102). Subsequently, the MRF server 502 extracts guidance message data corresponding to the extracted LGN from the guidance message DB 5027. The MRF server 502 multicast transmits the guidance message data using the extracted multicast address and extracted the port number (S103). After that, the MRF server 502 periodically multicast transmits the guidance message. Alternatively, the MRF server 502 may multicast transmit the guidance message each time the guidance message is updated. However, at that time, any of the AGW servers 5051, 5052, and 5053 cannot receive the guidance message multicast transmitted from the MRF server 502.

Thus, in the first embodiment, since the MRF server 502 does not perform a guidance message providing process for each restricted call, it transmits guidance message data after receiving an INVITE message and transmitting an OK message. Accordingly, the number of transmitted/received messages can be reduced in the first embodiment as compared with the above-described related art in which the TRYING (100) message and the ACK message are transmitted/received in addition to the above-described messages. In the first embodiment, like in the related art, after an INVITE message, a TRYING message, an OK message, and an ACK message have been exchanged between the CSCF server 503 and the MRF server 502, guidance message data may be transmitted from the MRF server 502.

The above-described process is performed when a first AGW to be call-restricted is detected. If another one of the AGW servers 5051, 5052, and 5053 is set as a subject of call restriction, the processing (S101) and the processing (S102) are not performed. The reason for this is that a desired guidance message has already been multicast transmitted from the MRF server 502 at the time of call restriction of the AGW server 5 (#m) (S103).

The AGW server 5 (#n) that is not call-restricted receives from the mobile terminal 9 (User1) via the base station 5071, 5072, 5073, 5074, etc. subordinated thereto a SETUP message (CC-SETUP) using the CC protocol when the AGW server 5 (#m) is call-restricted and a guidance message is multicast transmitted (S105). Here, "AGW server 5 (#n)" indicates one of AGW 5051, 5052, 5053 that is different from the value of "#m", and is also abbreviated as "AGW #n" as depicted in FIGS. 12 to 15. It is assumed that the SETUP message is a call connection request for the mobile terminal 9 (User2) connected to the call-restricted AGW server 5 (#m). At that time, like in the related art illustrated in FIG. 2, the AGW server 5 (#n) transmits an SIP INVITE message to the CSCF server 502 (S106).

Upon receiving the INVITE message, the CSCF server 503 extracts call request destination information from the INVITE message. The call request destination information is acquired from, for example, the request line included in the INVITE message. If the CSCF server 503 correctly receives the INVITE message, it transmits a TRYING (100) message back to the AGW server 5 (#n) (S107).

Upon receiving the TRYING (100) message from the CSCF server 503, the AGW server 5 (#n) transmits a CALL-PROCEEDING message (CC-CALL-PROC) to the mobile terminal 9 via the base station 5071, 5072, 5073, 5074, etc. subordinated thereto using the CC protocol (S108). Upon receiving the CALL-PROCEEDING message (CC-CALL-PROC), the mobile terminal 9 recognizes that the call request destination has started to be called and processing is being performed.

The CSCF server 503 transmits the TRYING (100) message back to the AGW server 5 (#n) (S107), and searches for the AGW server connected to the mobile terminal 9 that is the call request destination on the basis of the acquired call request destination information (User2). In this example, the CSCF server 503 determines that the AGW server 5 (#m) is connected to the mobile terminal that is the call request destination. If the CSCF server 503 determines that the AGW server 5 (#m) is call-restricted by referring to the AGW management DB 5038, it determines to connect the call to a guidance message. The CSCF server 503 transmits an SIP error message (503 Service Unavailable) including the LGN, the multicast address, and the port number which are included in the INVITE message transmitted to the MRF server 502 (S101) back to the AGW server 5 (#n) (S109).

Upon receiving the error message, the AGW server 5 (#n) determines whether the received error message is a first-type error message or a second-type error message. If the AGW server 5 (#n) determines that the error message is a second-type error message, it extracts the multicast address and the port number from the body part of the error message, and transmits a CONNECT message (CC-CONNECT) to the mobile terminal 9 (S110). Upon receiving a CONNECT-ACK message (CC-CONNECT ACKNOWLEDGE) from the mobile terminal 9 (S111), the AGW server 5 (#n) transmits an application for participation in a multicast group specified by the extracted multicast address to the MR 5041, 5042 connected thereto using IGMP (S112). In the participation application, the port number extracted from the error message is set as a transmission source port number. Upon receiving approval for the participation application from the MR 5041, 5042 (S113), the AGW server 5 (#n) prepares to receive data that is transmitted using the multicast address and the port number.

Instead of the CONNECT message (CC-CONNECT) and the CONNECT-ACK message (CC-CONNECT ACKNOWLEDGE), a PROGRESS message (CC-PROGRESS) and a PROGRESS-ACK message (CC-PROGRESS ACKNOWLEDGE) may be used. It may be determined which of a CONNECT message and a PROGRESS message should be used in accordance with the type (pay/free) of a provided guidance message.

Upon receiving the participation application from the AGW server 5 (#n) using IGMP, the MR 5041, 5042 stores the multicast address, the port number, and the IP address of the AGW server 5 (#n) registered as a transmission destination which are included in the participation application. After that, the MR 5041, 5042 transmits a multicast packet that has been transmitted thereto using the stored multicast address and the stored port number to an AGW that is registered as the transmission destination. At that time, if a plurality of AGWs are registered, the multicast packet is multicast transmitted to these AGWs. In this example, the guidance message data is multicast transmitted from the MRF server 502 to the MR 5041, 5042 and is then transferred from the MR 5041, 5042 to the AGW server 5 (#n) (S114).

That is, if the AGW server 5 (#n) transmits an application for participation in a target multicast group to the MR 5041, 5042, it can receive a guidance message that is multicast transmitted from the MRF server 502. Upon receiving a guidance message, the AGW server 5 (#n) transmits the guidance message to the mobile terminal 9 that is wirelessly connected thereto.

On the other hand, if the mobile terminal 9 that has received the guidance message disconnects the call, an SIP message is not transmitted/received to/from the IP network 1 and the CC protocol sequence (a DISCONNECT message (CC-DISCONNECT)(S115), a RELEASE message (CC-RELEASE) (S116), and a RELEASE-COMPLETE message (CC-RELEASE-COMPLETE)(S117)) illustrated in FIG. 2 is performed between the AGW server 5 (#n) and the mobile terminal 9.

If the wireless access connection between the AGW server 5 (#n) and the mobile terminal 9 that has received the guidance message is disconnected, the AGW server 5 (#n) transmits an application for withdrawal from the multicast group to which the guidance message is transmitted to the MR 5041, 5042 using IGMP (S118). Subsequently, the AGW server 5 (#n) receives from the MR 5041, 5042 approval for the withdrawal application (S119).

Upon receiving the withdrawal application from the AGW server 5 (#n) using IGMP, the MR 5041, 5042 excludes the AGW server 5 (#n) that is a transmission source of the withdrawal application from the multicast group on the basis of the multicast address and the port number which are included in the withdrawal application. After that, even if the MR 5041, 5042 receives a multicast packet that has been transmitted using the stored multicast address and the stored port number, it does not transmit the multicast packet to the AGW server 5 (#n). In this operational example, at the time of withdrawal from a multicast group, the withdrawal application is transmitted from the AGW server 5 (#n) to the MR 5041, 5042 (S118) and the withdrawal approval is transmitted from the MR 5041, 5042 to the AGW server 5 (#n) (S119). However, the MR 5041, 5042 may recognize the withdrawal state of the AGW server 5 (#n) using another method. In this embodiment, a method of withdrawing from a multicast group that is performed by the AGW server 5 (#n) is not limited to the above-described method.

Figure 13:
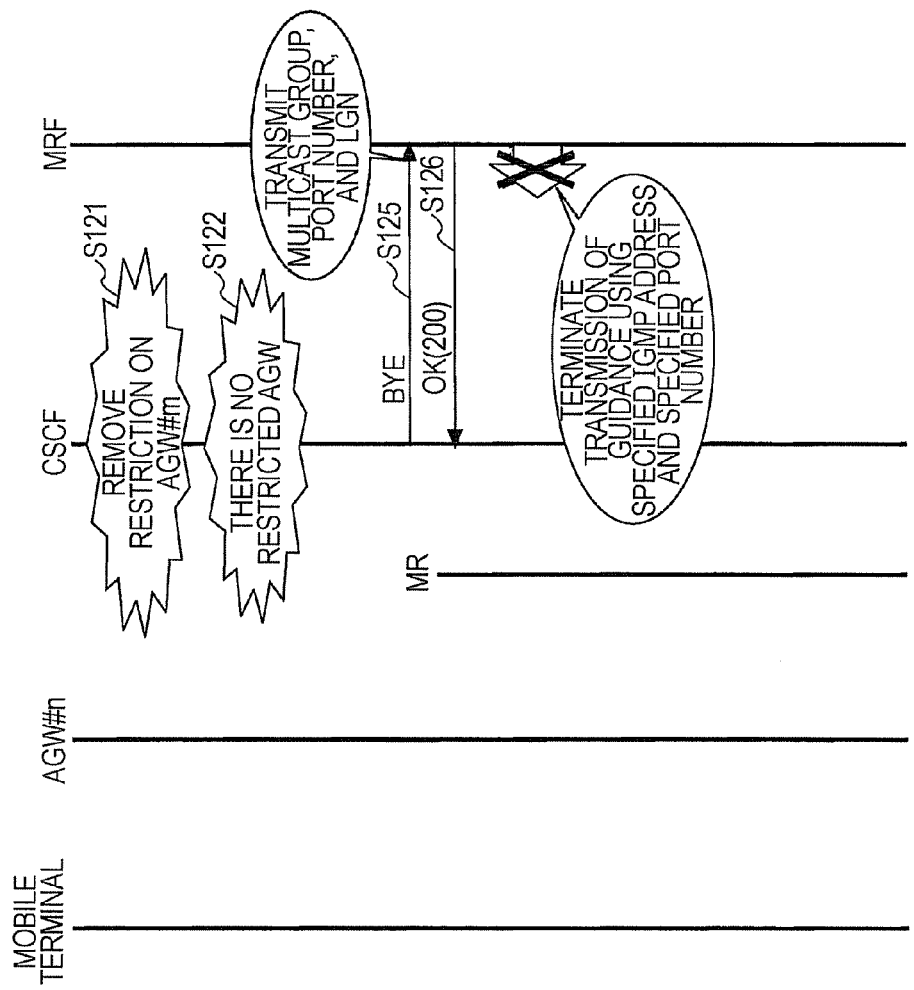
FIG. 13 illustrates a guidance message termination process.

FIG. 13 is a sequence chart illustrating a guidance message termination process according to the first embodiment.

If the CSCF server 503 detects the reduction in the load on the call-restricted AGW server 5 (#m), it determines to remove the call restriction on the AGW server 5 (#m) (S121). The CSCF server 503 may determine the removal of the call restriction on the basis of corrected pieces of information about the load on the AGW server or a notification transmitted from the AGW server. If the CSCF server 503 determines to remove the call restriction on the AGW server 5 (#m), it checks the presence of another call-restricted AGW server.

If the CSCF server 503 determines that there is no call-restricted AGW server (S122), it transmits an SIP BYE message to the MRF server 502 so as to terminate the transmission of a guidance message used for a call restriction instruction (S125). An LGN specifying the guidance message is set in the BYE message. Upon receiving the BYE message, the MRF server 502 terminates the multicast transmission of the guidance message specified by the LGN included in the BYE message.

[Operation and Effect in First Embodiment]

As described previously, in a mobile network system according to the first embodiment, if the CSCF server 503 sets one of the AGW servers 5051, 5052, and 5053 as a subject of call restriction, a guidance message is multicast transmitted from the MRF server 502 using a multicast address specified by the CSCF server 503. On the other hand, if a call request (an INVITE message) for the mobile terminal 9 connected to the call-restricted AGW server is transmitted to the CSCF server 503 via the AGW server that is not call-restricted, an error message including the multicast address and the port number which are used for the multicast transmission of the guidance message is transmitted to the AGW server that is not call-restricted. The AGW server that is not call-restricted transmits an application for participation in the multicast address included in the error message to the MR 5041, 5042, thereby receiving the guidance message multicast transmitted from the MRF server 502. As a result, a caller using the mobile terminal 9 from which the call request has been transmitted can listen to the guidance message.

Accordingly, according to the first embodiment, if a guidance message is multicast transmitted from the MRF server 502, it is not necessary to exchange an SIP message between the CSCF server 503 and the MRF server 502 in processing a call for the mobile terminal 9 connected to the call-restricted AGW server. Therefore, even if the number of calls for the mobile terminal 9 connected to the call-restricted AGW server is increased, the increase in the load on the CSCF server 503 and the MRF server 502 and the increase in the traffic of the IP network 1 can be prevented. Furthermore, according to the first embodiment, it is possible to prevent the increase in the load on a mobile network caused by the increase in the number of calls for the mobile terminal 9 connected to the call-restricted AGW server, that is, the number of calls to be restricted.

Furthermore, in the first embodiment, if the control section 5551 included in the AGW server receives multicast-transmitted guidance messages using RTP, the guidance messages are sequentially transferred to the RAN termination processing section 5556 and are then individually transmitted to the mobile terminals 9 that are wirelessly connected to the AGW server. That is, since the mobile terminal 9 receives a guidance message when the wireless access connection between the mobile terminal 9 and the AGW server is established, it sometimes receives a part of the guidance message. Accordingly, since a message is transmitted to each of the mobile terminals 9 in real time in the first embodiment, the first embodiment is applicable to a system in which a guidance message is changeable.

[Second Embodiment]

In a mobile network system according to the first embodiment, if the CSCF server 503 detects the AGW server to be call-restricted, it instructs the MRF server 502 to multicast transmit a specified guidance message. In a mobile network system according to the second embodiment, if the CSCF server 503 receives an INVITE message in which a mobile terminal connected to the call-restricted AGW server is set as the destination of a call request, it instructs the MRF server 502 to multicast transmit a specified guidance message. A mobile network system according to the second embodiment will be described in detail below focusing on the differences from a mobile network system according to the first embodiment.

[Apparatus Configuration]

The CSCF server 503 according to the second embodiment differs from the CSCF server 503 according to the first embodiment in that the call control section 5035 according to the second embodiment does not transmit an INVITE message to the MRF server 502 when determining the AGW server to be call-restricted so as to cause the MRF server 502 to multicast transmit a guidance message.

If the call control section 5035 receives an INVITE message from the AGW server, it determines whether the AGW server connected to the mobile terminal 9 that is the destination of a call request included in the INVITE message is call-restricted and the multicast transmission of a guidance message has yet to be performed. If the call control section 5035 determines that the AGW server connected to the mobile terminal 9 that is the destination of a call request included in the INVITE message is call-restricted and the multicast transmission of a guidance message has yet to be performed, it transmits an INVITE message to the MRF server 502 so as to cause the MRF server 502 to start the multicast transmission of a guidance message.

Upon receiving an OK (200) message from the MRF server 502 as a response to the INVITE message, the call control section 5035 transmits an SIP error message (503 Service Unavailable) back to the AGW server like in the first embodiment. After transmitting the INVITE message that is a guidance message transmission instruction, the call control section 5035 stores an LGN set in the INVITE message and the fact that it has already instructed the MRF server 502 to multicast transmit a guidance message. If the call control section 5035 determines that the AGW server connected to the mobile terminal 9 that is the destination of a call request included in the INVITE message is call-restricted and the multicast transmission of a guidance message has already been performed, it transmits an error message back to the AGW server without transmitting an INVITE message to the MRF server 502.

[Exemplary Operation]

Figure 14:
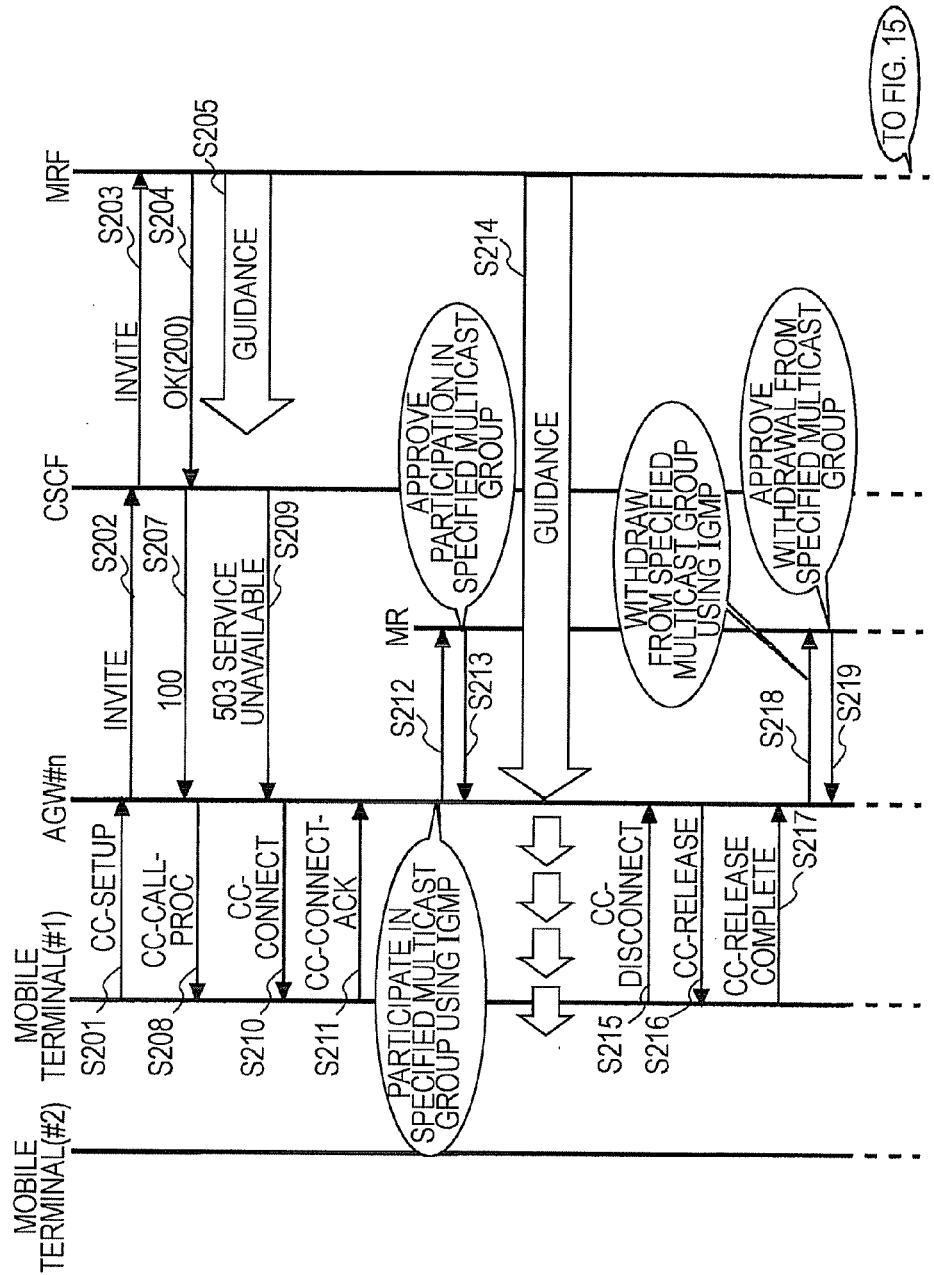
FIG. 14 illustrates a guidance message connection/disconnection process according to a second embodiment.

An exemplary operation of a mobile network system according to the second embodiment will be described. FIGS. 14 and 15 are sequence charts illustrating a guidance message connection/disconnection process according to the second embodiment.

The CSCF server 503 sets the AGW server 5 (#m) as a subject of call restriction. In this state, the AGW server 5 (#n) that is not call-restricted receives a SETUP message (CC-SETUP) from the mobile terminal 9 (#1) (User1) via the base station 5071, 5072, 5073, 5074, etc. subordinated thereto using the CC protocol (S201). The SETUP message is a call connection request for the mobile terminal 9 (User 2) connected to the call-restricted AGW server 5 (#m). Like in the first embodiment, the AGW server 5 (#n) transmits an SIP INVITE message to the CSCF server 503 (S202).

Upon receiving the INVITE message from the AGW server 5 (#n), the CSCF server 503 extracts call request destination information from the INVITE message. The call request destination information is acquired from, for example, the request line of the INVITE message. If the CSCF server 503 correctly receives the INVITE message, it transmits a TRYING (100) message back to the AGW server 5 (#n) (S207).

Upon receiving the TRYING (100) message from the CSCF server 503, the AGW server 5 (#n) transmits a CALL-PROCEEDING message (CC-CALL-PROC) to the mobile terminal 9 (#1) via the base station subordinated thereto using the CC protocol (S208). Upon receiving the CALL-PROCEEDING message (CC-CALL-PROC), the mobile terminal 9 (#1) recognizes that the destination of the call request has started to be called and processing is being performed.

The CSCF server 503 transmits the TRYING (100) back to the AGW server 5 (#n) (S207) and searches for the AGW server connected to a mobile terminal that is the destination of the call request on the basis of the acquired call request destination information (User2). In this example, the CSCF server 503 determines that the AGW server 5 (#m) is connected to a mobile terminal that is the destination of the call request.

The CSCF server 503 determines whether the AGW server 5 (#m) is call-restricted by referring to the AGW management DB 5038. If the CSCF server 503 determines that the AGW server 5 (#m) is call-restricted, it determines that the call should be connected to a guidance message and acquires an LGN specifying the guidance message. The CSCF server 503 determines whether the guidance message specified by the LGN has already been multicast transmitted. If the CSCF server 503 determines that the guidance message has yet to be multicast transmitted, it generates an INVITE message in which the LGN is set as the call request destination information and transmits the INVITE message to the MRF server 502 (S203). The generated INVITE message is the same as that according to the first embodiment.

Upon receiving the INVITE message, the MRF server 502 extracts the LGN, a multicast address, and a port number from the INVITE message and stores these pieces of information. The MRF server 502 transmits an OK (200) message back to the CSCF server 503 (S204). Subsequently, the MRF server 502 extracts guidance message data corresponding to the extracted LGN from the guidance message DB 5027. The MRF server 502 multicast transmits the guidance message data using the extracted multicast address and the extracted port number (S205). After that, the MRF server 502 periodically multicast transmits the guidance message. Alternatively, the MRF server 502 may multicast transmit the guidance message each time the guidance message is updated. However, at that time, any of the AGW servers 5051, 5052, and 5053 cannot receive the guidance message multicast transmitted from the MRF server 502.

Upon receiving the OK (200) message from the MRF server 502, the CSCF server 503 transmits an SIP error message (503 Service Unavailable) including the multicast address and the port number which are included in the INVITE message transmitted to the MRF server 502 (S203) to the AGW server 5 (#n) (S209). As the error message, the second-type error message illustrated in FIG. 9 is generated.

Upon receiving the error message, the AGW server 5 (#n) determines whether the error message is a first-type error message or a second-type error message. If the AGW server 5 (#n) determines that the error message is a second-type error message, it extracts the multicast address and the port number from the error message. Subsequently, the AGW server 5 (#n) transmits a CONNECT message (CC-CONNECT) to the mobile terminal 9 (#1) via the base station subordinated thereto (S210).

Upon receiving a CONNECT-ACK message from the mobile terminal 9 (#1) via the base station subordinated to the AGW server 5 (#n) (S211), the AGW server 5 (#n) transmits an application for participation in a multicast group specified by the extracted multicast address to the MR 5041, 5042 connected thereto using IGMP (S212). In the participation application, the port number extracted from the error message is set as a transmission source port number.

Upon receiving approval for the participation application from the MR 5041, 5042 (S213), the AGW server 5 (#n) prepares to receive data that is transmitted using the multicast address and the port number. Like in the first embodiment, in the second embodiment, instead of the CONNECT message (CC-CONNECT) and the CONNECT-ACK message (CC-CONNECT ACKNOWLEDGE), a PROGRESS message (CC-PROGRESS) and a PROGRESS-ACK message (CC-PROGRESS ACKNOWLEDGE) may be used.

Upon receiving the participation application from the AGW server 5 (#n) using IGMP, the MR 5041, 5042 stores the multicast address, the port number, and the IP address of the AGW server 5 (#n) registered as a transmission destination which are included in the participation application. After that, the MR 5041, 5042 transmits a multicast packet that has been transmitted thereto using the stored multicast address and the stored port number to an AGW that is registered as the transmission destination. At that time, if a plurality of AGWs are registered, the multicast packet is multicast transmitted to these AGWs. In this example, the guidance message data is multicast transmitted from the MRF server 502 to the MR 5041, 5042 and is then transferred from the MR 5041, 5042 to the AGW server 5 (#n) (S214).

That is, if the AGW server 5 (#n) transmits an application for participation in a target multicast group to the MR 5041, 5042, it can receive a guidance message that is multicast transmitted from the MRF server 502. Upon receiving a guidance message, the AGW server 5 (#n) transmits the guidance message to the mobile terminal 9 (#1) that is wirelessly connected thereto.

On the other hand, if the mobile terminal 9 (#1) that has received the guidance message disconnects the call, an SIP message is not transmitted/received to/from the IP network 1 and the CC protocol sequence (a DISCONNECT message (CC-DISCONNECT)(S215), a RELEASE message (CC-RELEASE)(S216), and a RELEASE-COMPLETE message (CC-RELEASE-COMPLETE)(S217)) illustrated in FIG. 2 is performed between the AGW server 5 (#n) and the mobile terminal 9 (#1).

If the wireless access connection between the AGW server 5 (#n) and the mobile terminal 9 (#1) that has received the guidance message is disconnected, the AGW server 5 (#n) transmits an application for withdrawal from the multicast group to which the guidance message is transmitted to the MR 5041, 5042 using IGMP (S218). Subsequently, the AGW server 5 (#n) receives from the MR 5041, 5042 approval for the withdrawal application (S219).

Upon receiving the withdrawal application from the AGW server 5 (#n) using IGMP, the MR 5041, 5042 excludes the AGW server 5 (#n) that is a transmission source of the withdrawal application from the multicast group on the basis of the multicast address and the port number which are included in the withdrawal application. After that, even if the MR 5041, 5042 receives a multicast packet that has been transmitted using the stored multicast address and the stored port number, it does not transmit the multicast packet to the AGW server 5 (#n). In this embodiment, a method of withdrawing from a multicast group that is performed between the AGW server 5 (#n) and the MR 5041, 5042 is not limited to the above-described method.

The above-described process is a process performed in a case where a guidance message has yet to be multicast transmitted in response to a call connection request in which the mobile terminal 9 connected to the call-restricted AGW server 5 (#m) is set as a call request destination. A process performed in a case where the guidance message has already been multicast transmitted will be described below with reference to FIG. 15.

In the above-described process, the guidance messages used for call restriction are multicast transmitted from the MRF server 502 (S205 and S214). In this state, the AGW server 5 (#n) that is not call-restricted receives a SETUP message (CC-SETUP) from the mobile terminal 9 (#2) via the base station 5071, 5072, 5073, 5074, etc. subordinated thereto using the CC protocol (S221). The SETUP message is a call connection request for the mobile terminal 9 connected to the call-restricted AGW server 5 (#m). Like in the first embodiment, the AGW server 5 (#n) transmits an SIP INVITE message to the CSCF server 503 (S222).

Upon receiving the INVITE message from the AGW server 5 (#n), the CSCF server 503 extracts call request destination information from the INVITE message. The CSCF server 503 searches for the AGW server 5 connected to a mobile terminal that is the destination of the call request on the basis of the call request destination information. For example, the CSCF server 503 determines that the AGW server 5 (#m) is connected to a mobile terminal that is the destination of the call request.

The CSCF server 503 determines whether the AGW server 5 (#m) is call-restricted by referring to the AGW management DB 5038. If the CSCF server 503 determines that the AGW server 5 (#m) is call-restricted, it determines to connect the call to a guidance message and acquires an LGN specifying the guidance message. The CSCF server 503 determines whether a guidance message specified by the LGN has already been multicast transmitted. In this example, the CSCF server 503 determines that the guidance message has already been multicast transmitted.

If the CSCF server 503 determines that the guidance message has already been multicast transmitted, it generates an SIP error message (503 Service Unavailable) including the multicast address and the port number which are stored in association with the guidance message. Subsequently, the CSCF server 503 transmits a TRYING (100) message back to the AGW server 5 (#n) (S223) and transmits the generated error message back to the AGW server 5 (#n) (S225). The generated error message is a second-type error message.

Upon receiving the error message, the AGW server 5 (#n) determines whether the error message is a first-type error message or a second-type error message like in the first embodiment. If the AGW server 5 (#n) determines that the error message is a second-type error message, it extracts the multicast address and the port number from the error message, and transmits a CONNECT message (CC-CONNECT) to the mobile terminal 9 (#2) (S226).

Upon receiving a CONNECT-ACK message from the mobile terminal 9 (#2) via the base station subordinated to the AGW server 5 (#n) (S227), the AGW server 5 (#n) transmits an application for participation in a multicast group specified by the extracted multicast address to the MR 5041, 5042 connected thereto using IGMP (S228). In the participation application, the port number extracted from the error message is set as a transmission source port number. If the AGW server 5 (#n) receives approval for the participation application from the MR 5041, 5042 (S229), the guidance message data is transferred from the MR 5041, 5042 to the AGW server 5 (#n) (S230).

Upon receiving the guidance message, the AGW server 5 (#n) transmits the guidance message to the mobile terminal 9 (#2) that is wirelessly connected thereto.

A process of disconnecting the call performed by the mobile terminal 9 (#2) that has received the guidance message is described previously, and the description thereof will be therefore omitted.

[Operation and Effect in Second Embodiment]

As described previously, in a mobile network system according to the second embodiment, upon receiving an INVITE message from the AGW server, the CSCF server 503 determines whether the AGW server connected to a mobile terminal that is the destination of a call request is call-restricted on the basis of call request destination information included in the INVITE message. If the AGW server is call-restricted, the CSCF server 503 further determines whether a predetermined guidance message has already been multicast transmitted. If it is determined that the guidance message has yet to be multicast transmitted, an INVITE message that is an instruction for multicast transmitting a specified guidance message is transmitted from the CSCF server 503 to the MRF server 502.

After that, like in the first embodiment, an SIP error message is transmitted from the CSCF server 503 to the AGW server. The AGW server transmits an application for participation in the multicast address included in the error message to the MR 5041, 5042, thereby receiving the guidance message.

Therefore, according to the second embodiment, the MRF server 502 starts to multicast transmit a guidance message only after a call connection request for the mobile terminal 9 connected to the call-restricted AGW server has been generated. Accordingly, according to the second embodiment, an effect similar to that obtained in the first embodiment can be obtained, and the wasteful consumption of a communication resource can be prevented.

[Others]

[Hardware Component and Software Component]

A hardware component is a hardware circuit, and is, for example, a Field Programmable Gate Array (FPGA), an Application Specific Integrated Circuit (ASIC), a gate array, a combination of logic gates, a signal processing circuit, or an analog circuit.

Software components are (segments of) components for realizing the above-described processing as software, and are not any concept that limits a language, a development environment, etc., which realize the software. The software components are, for example, a task, a process, a thread, a driver, firmware, a database, a table, a function, a procedure, a subroutine, a predetermined part of a program code, a data structure, an array, a variable, a parameter, etc. These software components are realized on a single or a plurality of memories (a single or a plurality of processors (e.g., Central Processing Units (CPUs) or Digital Signal Processors (DSPs)).

It is to be noted that the embodiments do not limit a method of realizing the above-described processing units. The above-described processing units may be configured using a method that can be achieved by ordinary engineers in the field of the present technology by way of the hardware components, the software components, or the combinations thereof.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A mobile network system comprising:
   a guidance message control server;
   a call control server; and
   a plurality of access gateways each of which is connected to a mobile terminal via a wireless base station,
   wherein the call control server includes,
   a receiving section that receives from a first access gateway included in the plurality of access gateways a call request notification that a first mobile terminal has made a call request for a second mobile terminal,
   a determination section that determines whether a second access gateway that is included in the plurality of access gateways and is connected to the second mobile terminal specified in the call request notification received by the receiving section is call-restricted,
   an instructing section that transmits a message transmission instruction including message specifying information and group specifying information to the guidance message control server, and
   a response section that, in a case where the determination section determines that the second access gateway is call-restricted, transmits a response message including the same group specifying information as that included in the message transmission instruction to the first access gateway,
   wherein the guidance message control server includes,
   an instruction receiving section that receives the message transmission instruction from the call control server,
   an acquisition section that acquires guidance message data specified by the message specifying information included in the message transmission instruction received by the instruction receiving section, and
   a transmission section that multicast transmits the guidance message data acquired by the acquisition section to a multicast group specified by the group specifying information included in the message transmission instruction received by the instruction receiving section and,
   wherein the first access gateway includes,
   a relay section that receives from the first mobile terminal via the wireless base station a call connection request for the second mobile terminal and transmits the call request notification to the call control server in response to the call connection request,
   a processing section that, in a case where the processing section receives the response message from the call control server, performs multicast group participation processing for participating in the multicast group specified by the group specifying information included in the response message, and
   a guidance transmission section that transmits the guidance message data that is received as a result of the multicast group participation processing performed by the processing section to the first mobile terminal.

2. The mobile network system according to claim 1,
   wherein the response section further includes a check section that checks whether the instructing section has already transmitted the message transmission instruction, and
   wherein, in a case where the determination section determines that the second access gateway is call-restricted and the check section checks that the message transmission instruction has yet to be transmitted, the response section transmits the response message after causing the instructing section to transmit the message transmission instruction.

3. The mobile network system according to claim 1,
   wherein, in a case where the relay section receives from the first mobile terminal via the wireless base station a call disconnection request for the second mobile terminal, the relay section disconnects a connection between the first mobile terminal and the first access gateway, and
   wherein, in a case where the relay section disconnects the connection between the first mobile terminal and the first access gateway, the processing section performs processing for withdrawing from the multicast group in which the first access gateway has participated.

4. The mobile network system according to claim 1, wherein, in a case where it is determined that the second access gateway is call-derestricted and all of the plurality of access gateways are call-derestricted, the instructing section transmits a message transmission termination instruction to the guidance message control server.

5. A guidance message providing method performed in a mobile network system including a guidance message control server, a call control server, and a plurality of access gateways each of which is connected to a mobile terminal via a wireless base station, the guidance message providing method comprising:
   causing the call control server,
   to receive from a first access gateway included in the plurality of access gateways a call request notification that a first mobile terminal has made a call request for a second mobile terminal,
   to determine whether a second access gateway that is included in the plurality of access gateways and is connected to the second mobile terminal specified in the received call request notification is call-restricted, to transmit a message transmission instruction including message specifying information and group specifying information to the guidance message control server, and to, in a case where it is determined that the second access gateway is call-restricted, transmit a response message including the same group specifying information as that included in the message transmission instruction to the first access gateway;

causing the guidance message control server, to receive the message transmission instruction from the call control server, to acquire guidance message data specified by the message specifying information included in the received message transmission instruction, and to multicast transmit the acquired guidance message data to a multicast group specified by the group specifying information included in the received message transmission instruction; and causing the first access gateway, to receive from the first mobile terminal via the wireless base station a call connection request for the second mobile terminal and transmit the call request notification to the call control server in response to the call connection request, to, in a case where the response message is received from the call control server, perform multicast group participation processing for participating in the multicast group specified by the group specifying information included in the response message, and to transmit the guidance message data that is received as a result of the multicast group participation processing to the first mobile terminal.

6. The guidance message providing method according to claim 5, further comprising causing the call control server, to check whether the message transmission instruction has already been transmitted, and to, in a case where it is determined that the second access gateway is call-restricted and it is checked that the message transmission instruction has yet to be transmitted, transmit the response message after transmitting the message transmission instruction.

7. The guidance message providing method according to claim 5, further comprising causing the first access gateway, to, in a case where a call disconnection request for the second mobile terminal is received from the first mobile terminal via the wireless base station, disconnect a connection between the first mobile terminal and the first access gateway, and to, in a case where the connection between the first mobile terminal and the first access gateway is disconnected, perform processing for withdrawing from the multicast group in which the first access gateway has participated.

8. The guidance message providing method according to claim 5, further comprising causing the call control server to, in a case where it is determined that the second access gateway is call-derestricted and all of the plurality of access gateways are call-derestricted, transmit a message transmission termination instruction to the guidance message control server.

9. A method of providing a guidance message, comprising:

receiving a call request notification at a call control server that a first mobile terminal has made a call request for a second mobile terminal from a first access gateway included in a plurality of access gateways;

determining whether a second access gateway that is included in the plurality of access gateways and is connected to the second mobile terminal specified in the received call request notification is call-restricted, transmitting a message transmission instruction including message specifying information and group specifying information to a guidance message control server, and transmitting a response message including the group specifying information to the first access gateway if the second access gateway is call-restricted;

receiving the message transmission instruction at the guidance message control server, acquiring guidance message data specified by the message specifying information included in the received message transmission instruction, transmitting the acquired guidance message data to a multicast group specified by the group specifying information included in the received message transmission instruction; and receiving a call connection request for the second mobile terminal from the first mobile terminal via the wireless base station at a first access gateway;

transmitting the call request notification to the call control server in response to the call connection request, participating in the multicast group specified by the group specifying information included in the response message if the response message is received from the call control server, and transmitting the guidance message data that is received as a result of the multicast group participation to the first mobile terminal.

* * * * *

UNITED STATES PATENT AND TRADEMARK OFFICE
CERTIFICATE OF CORRECTION

PATENT NO. : 8,346,269 B2
APPLICATION NO. : 12/638245
DATED : January 1, 2013
INVENTOR(S) : Kazuyuki Ohtsu et al.

It is certified that error appears in the above-identified patent and that said Letters Patent is hereby corrected as shown below:

In the Claims:

Column 22, Line 7-8, In Claim 1, delete "section and," and insert -- section, and --, therefor.

Signed and Sealed this
Seventh Day of May, 2013

Teresa Stanek Rea
*Acting Director of the United States Patent and Trademark Office*